(12) United States Patent
Takahashi et al.

(10) Patent No.: US 8,621,467 B2
(45) Date of Patent: Dec. 31, 2013

(54) JOB PROCESSING METHOD, RECORDING MEDIUM, PROGRAM AND SYSTEM

(75) Inventors: Hiroyuki Takahashi, Yokohama (JP); Kazuhiko Ushiyama, Edogawa-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 2142 days.

(21) Appl. No.: 11/140,308

(22) Filed: May 27, 2005

(65) Prior Publication Data
US 2005/0267797 A1   Dec. 1, 2005

(30) Foreign Application Priority Data

May 31, 2004   (JP) ................................ 2004-162021

(51) Int. Cl.
*G06F 9/46*   (2006.01)
(52) U.S. Cl.
USPC ......................................................... 718/102
(58) Field of Classification Search
USPC ......................................................... 718/102
See application file for complete search history.

(56) References Cited

U.S. PATENT DOCUMENTS

| | | | |
|---|---|---|---|
| 6,026,258 A * | 2/2000 | Fresk et al. ................. | 399/87 |
| 6,367,997 B2 * | 4/2002 | Ito ................................ | 400/582 |
| 6,452,692 B1 * | 9/2002 | Yacoub ......................... | 358/1.15 |
| 6,504,621 B1 * | 1/2003 | Salgado ......................... | 358/1.16 |
| 6,549,947 B1 | 4/2003 | Suzuki | |
| 7,405,844 B2 * | 7/2008 | Ferlitsch ........................ | 358/1.6 |
| 7,426,059 B2 * | 9/2008 | Broda et al. ................... | 358/1.3 |
| 2001/0053295 A1 * | 12/2001 | Kujirai et al. ................. | 399/79 |
| 2002/0054312 A1 * | 5/2002 | Tomita ........................... | 358/1.13 |
| 2002/0097414 A1 * | 7/2002 | Utsunomiya .................. | 358/1.13 |
| 2002/0134268 A1 * | 9/2002 | Yamada ......................... | 101/484 |
| 2004/0095595 A1 * | 5/2004 | Jacobsen ....................... | 358/1.14 |
| 2004/0165211 A1 * | 8/2004 | Herrmann et al. ........... | 358/1.15 |

FOREIGN PATENT DOCUMENTS

| | | |
|---|---|---|
| CN | 1453697 | 11/2003 |
| JP | 9-179704 A | 7/1997 |
| JP | 2002-312136 A | 10/2002 |

* cited by examiner

*Primary Examiner* — Gregory A Kessler
(74) *Attorney, Agent, or Firm* — Canon USA Inc. IP Division

(57) ABSTRACT

In the event that job data to be transmitted from a first information processing device is first-type job data, but a second information processing device is not ready to immediately perform processing of the job data, the first information processing device can be inhibited from transmission of the job data. In the event that job data to be transmitted from the first information processing device is the first-type job data and the second information processing device is ready to immediately perform processing of the job data immediately, the first information processing device is permitted to transmit the job data. Thus, various types of problems or user demands that can occur in a situation in which a user accidentally or inadvertently transmits critical data such as secret documents or private documents or the like to a device which cannot process the job data immediately are handled as much as possible.

9 Claims, 15 Drawing Sheets

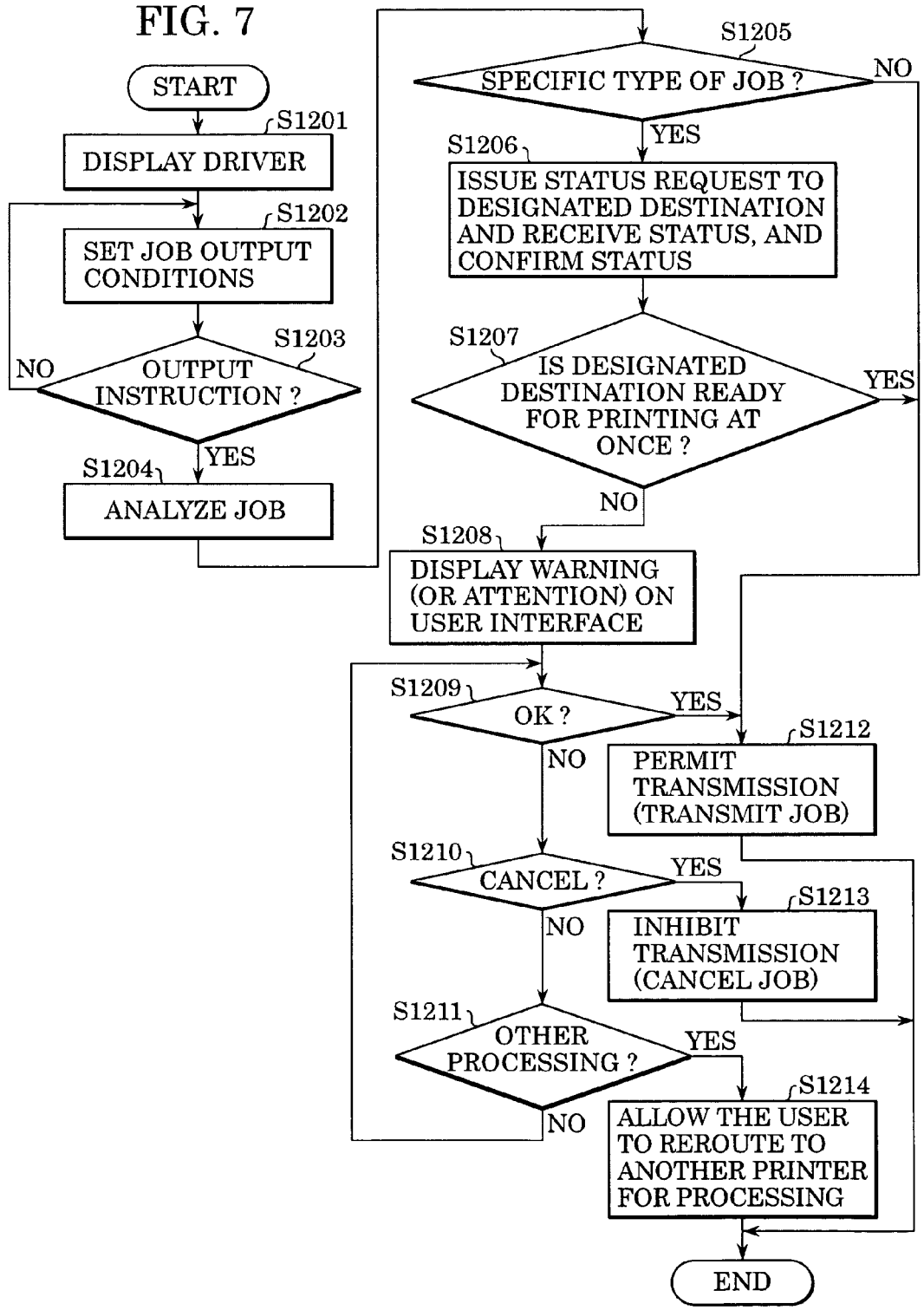

FIG. 11A

Job Management

| | |
|---|---|
| Job Priority: | Medium ▶ |
| Job Management: | Save Job ▶ |
| Reprint Management: | Delete Print Ready File ▶ |
| Job Scheduling: | Print ▶ |
| E-mail Notification: | Disabled ▶ |
| E-mail Address: | |
| Annotation: | Disabled ▶ |
| AnnotationText: | |
| Job Security Level: | Hight ▶ |

Finishing

| | |
|---|---|
| Stapling: | Off ▶ |
| Hole Punch: | Off ▶ |
| Booklet: | Off ▶ |
| Z-Fold: | Off ▶ |
| Use Inserter: | Off ▶ |
| Insert Page: | |
| Banner Page: | Off ▶ |
| Sorting: | Collate ▶ |
| Trimmer: | Off ▶ |
| Trim Offset: | |

Image Quality

| | |
|---|---|
| Sharpness: | Normal ▶ |
| Brightness: | Normal ▶ |
| Color Mode: | CMYK ▶ |
| Toner Reduction: | Off ▶ |
| Copier Mode: | Character ▶ |
| Gloss Adjustment: | Standard ▶ |
| Pure Black Text/Graphics: | Off ▶ |
| Gloss Adjustment: | Off ▶ |
| Force Black Overprint: | Off ▶ |
| Gradation Smoothing: | Off ▶ |
| Combine Separation: | Off ▶ |
| Bits Per Pixel: | 8 ▶ |

Color

| | |
|---|---|
| Linearization Profile: | MFP104.lud ▶ |
| ICC Color Matching: | Enabled ▶ |
| Rendering Intent: | Perceptual ▶ |
| ICC Printer Profile: | MFP104.icc ▶ |
| ICC CMYK Profile: | SWOP.icc ▶ |
| ICC RGB Profile: | SRGB.icc ▶ |
| Black Limit (0-255): | 255 ▶ |
| Cyan Limit (0-255): | 255 ▶ |
| Magenta Limit (0-255): | 255 ▶ |
| Yellow Limit (0-255): | 255 ▶ |
| Total Limit (0-255): | 1020 ▶ |

RECORDING MEDIUM SUCH AS FD/CD-ROM

| DIRECTORY INFORMATION |
|---|
| FIRST DATA PROCESSING PROGRAM PROGRAM CODE GROUP CORRESPONDING TO STEPS OF FLOWCHART SHOWN IN FIG. 7 |
| SECOND DATA PROCESSING PROGRAM PROGRAM CODE GROUP CORRESPONDING TO STEPS OF FLOWCHART SHOWN IN FIG. 9 |
| THIRD DATA PROCESSING PROGRAM PROGRAM CODE GROUP CORRESPONDING TO STEPS OF FLOWCHART SHOWN IN FIG. 15 |
|  |

MEMORY MAP OF RECORDING MEDIUM

JOB PROCESSING METHOD, RECORDING MEDIUM, PROGRAM AND SYSTEM

BACKGROUND OF THE INVENTION

1. Field of the Invention

The present invention relates to a job processing method, recording medium, program, and system, suitable for a system including an information processing device such as a computer capable of transmitting job data that can be processed by an information processing device such as a printing device, for example.

2. Description of the Related Art

Hitherto, various types of data (also referred to as job data, or simply jobs) have been output at printing devices such as copiers, printers, and the like, in various environments such as offices, public offices, banks, hospitals, schools, and the like.

For example, with a conventional office environment, there are cases in which a user transmits a job to a printer (or multifunction peripheral (MFP)) so as to print a document created by a personal computer (PC) serving as an example of an information processing device, from the printer. However, the job is not printed or output is not started at once.

Such a state is often caused when the printer side is preparing, sleeping, printing, in an error state, or the like. Additionally, such a state can be caused because another job is being printed with the printer, or multiple print jobs are queued.

In such a case, since current printing devices are high-capability devices including a memory, such as a hard disk or the like therein, an arrangement has been proposed in which jobs transmitted from the PC are saved in memory during such a state so as to resume printing when such a state is resolved.

An alternative arrangement has been proposed wherein in the event that a host computer transmits a job to a printer, a user can confirm the state of the printer on a screen such as a printer driver of the computer. Depending on the level of experience of the user using a PC, such as a user accustomed to the operations, a user quite familiar with electronic apparatuses, and the like, it is likely that the user can instruct the printer to perform printing processing after confirming the state of the printer displayed on the aforementioned printer driver screen, in such a case in which the user transmits a print job from the PC to a printer so as to control the printer to print the print job by making full use of operating techniques.

A printing control device has been proposed (in Japanese Patent Laid-Open No. 9-179704) in which the printing data transmitted from an information processing device such as a workstation, personal computer, or the like, and printed by a printing device, is stored in a printing control device capable of accepting the printing data from the information processing device. In the event of printing the stored printing data again, determination is made whether or not printing can be performed with the configuration of printing at that time. In the event that printing cannot be performed, the printing attributes or configuration can be modified so as to perform printing.

Thus, various types of situations can occur under various types of use environments. For example, there may be a situation in which a user wants to rapidly print out a document created with an information processing device such as a PC on a printer, and obtain the printed document within a short period of time, such as a time period from arriving at the office until before the start of a morning conference.

With such a situation, it can be assumed that shortly after inputting a printing start instruction of the document to be immediately required, the user hurries to the printer side so as to obtain the document that should have been printed out. However, on the printer side, a situation can occur in which printout has not been completed (including cases in which printing operation itself has not been started) due to causes such as those mentioned above.

In such a situation (the document required immediately has not been printed out on the printer side, contrary to the expectations of the user that the document should have been printed out on the printer side), the following actions may be assumed to be taken by the user.

For example, in the event that there are multiple printers in an office, and another printer is available, the user rapidly returns to his/her own seat in front of his/her own computer, gives up on printout with the aforementioned printer, and reissues a printout instruction of the document so as to perform printout with another available printer.

Also, for example, in the event that another available printer itself does not exist in an office, or in the event that there is no more time to wait until the document is printed out on the printer because of the schedule of user, the user operates the operating unit of the printer to which the job is transmitted so as to quit the job in order to quit printout itself of the data transmitted from the PC to the printer.

Thus, in a situation in which the job transmitted from the PC cannot be immediately printed out at the printer, the user may be forced to take some action.

Here, it should be noted that a conceivable user reaction to such a scenario would be that if printout cannot be performed at the printer immediately, the user needs to know this prior to transmitting a job from the PC. This can be considered to be a substantial user demand.

Also, as described above, even if the user wants to cancel the job in the event that printout cannot be performed immediately, the job once input (the job regarding which a printout start instruction has been input at the PC by the user via a user interface such as a printer driver or the like) cannot be cancelled from the client side in the event that the job has been transmitted to the printer side, and the transition is changed to a printout-waiting state, though canceling during spooling may be possible. Also, even if canceling cannot be instructed from the operating unit on the PC side, the user can cancel the job by proceeding to the printer side as described above, and inputting a cancel instruction from the operating unit of the printer, but the job has been stored in external memory (memory included in the printing device itself or memory included in a server device) different from his/her own PC until the cancel instruction is input.

Thus, even if the user wants to cancel the printout, it makes no difference that the job goes to a remote location from the client side even though temporarily (the job data from the client computer is saved in the memory of another external device different from the client computer such as a server device, printer, or the like capable of receiving the job data from the client computer).

Consequently, a reasonable user demand would be that if printout cannot be performed immediately according to the content and type of data, printout itself should be prevented beforehand as a matter of course, and further, if possible, the job should be prevented from being stored in the external memory (memory of a device other than his/her own information processing device such as memory included in the printing device itself or memory included in a server device or the like) and from being transmitted from the PC, for the sake of a printer which cannot print the job immediately.

Particularly, in the event that the type of data is data including private information such as personal identity documents, documents relating to insurance, and the like, or data having a high level of secrecy and importance such as data of conference documents and specifications, a user would want to hide such information from outsiders. Accordingly, in the event of such data, a user would want to prevent the aforementioned situations from occurring as much as possible, from the perspective of preventing leaking of information.

Further, it should be noted that even if a device (printing device or server, in this example) has high-security functions making information leaks impossible, storing data in external memory (printing device or server, in this example) is still going to be performed, and the arrangement is no different from that above as far as this issue is concerned. Accordingly, if a user should feel that the data is not secure and that information may leak, using a device (printing device or server, in this example) having high-security functions cannot completely eliminate such fears.

SUMMARY OF THE INVENTION

The present invention provides a job processing method, recording medium, program, and system, which can solve the aforementioned problems.

The present invention provides a user-friendly and user-advantageous arrangement corresponding to various user demands and needs under various environments, capable of preventing the aforementioned problems.

In a situation in which a user accidentally or inadvertently transmits important data to a device, which cannot process job data immediately, the present invention provides an arrangement for eliminating the feeling of insecurity of the owner of the data as much as possible.

Also, in the event that a user transmits a job to a certain device from the user's own device, following which the user finds that the device cannot process the job immediately, the present invention provides an arrangement for eliminating work and labor that can occur conventionally, such as the user canceling the job and requesting processing of the job to another device for processing, or the like. In addition, in the event that the user accidentally transmits a job for processing secret documents, private documents, or the like to a device which cannot process the job immediately, the present invention provides an arrangement for preventing waiting time from occurring as with conventional arrangements, since such waiting time causes the user to become worried that leaking of secret information, leaking of private information, or the like might occur, until the job is processed.

Further, the present invention provides a user-friendly and user-advantageous arrangement corresponding to various user demands and needs under various environments, capable of preventing problems that cannot be handled by a confirmation display function of the printer state or the like provided by conventional printer drivers or the like, and also solving the aforementioned problems.

Note that this confirmation display of printer state on the screen of a conventional printer driver is passive, and confirmation of a printer state is performed using polling (a function for accessing a device periodically), so the present invention focuses attention such that display of the printer driver screen does not necessarily reflect the current state of the printer completely, depending on timing that the PC acquires a state from the printer, or timing displaying the state.

Thus, in the event that time offset occurs between the state of the printer that the PC recognizes and the current state on the printer side even momentarily, even if the state display of the printer driver displays "ready" or "idle", the printer may not actually print job data immediately due to an "error" or "warming up" state or the like.

Consequently, even if the user transmits the job from the PC to the printer after confirming the state of the printer using the driver, a situation in which the job cannot be processed immediately cannot always be avoided.

Also, many printer drivers often simply display the standby state of a printer alone, so even if the current state is "ready" or "idle", the printer starts temperature adjustment of a fixer immediately after the user inputs a printout instruction. In reality, it often spends a considerable amount of time until the printer reaches a state in which the fixer is warmed so that the printer can print job data.

Moreover, with such a function, it is an axiomatic understanding that it is the user using the PC who will intentionally, voluntarily, and aggressively confirm the state of the printer. Accordingly, even if the PC is configured so as to confirm the status display of the printer, in the event that a user unaccustomed to operating of the PC does not become aware that there is a function to monitor the state of a printer at the PC, or in the event that even if the user or the like checks and recognizes the state of the printer, but the user himself/herself does not recognize how the job to be transmitted from the PC for printing processing is affected, the aforementioned problems (various types of problems in the event that the user transmits a print job that the user wants to print out rapidly, but the printer side cannot be in a state in which the printer can print out the job immediately) cannot be solved, and also the aforementioned various types of requests cannot be handled satisfactorily.

This is not limited to the aforementioned arrangement wherein the state of the printer can be recognized in a polling manner from the PC; even if an arrangement is made wherein the state of the printer can be displayed on the PC and confirmed in real time according to a user request of the PC, unless the user himself/herself using the PC can use such a function aggressively, and also can recognize the information thereof, similar problems may occur, and also the aforementioned various requests may not be handled satisfactorily.

Consequently, even if problems occur that conventional printer drivers or the like having a function for displaying and confirming the state of a printer prior to transmitting a job to the printer from the PC beforehand cannot handle, the present invention solves such problems, and further provides an arrangement wherein the aforementioned various requests can be handled satisfactorily.

As described above, the present invention provides an arrangement for handling demands wherein for example, if a job that the user wants to cancel immediately in the event that printout thereof cannot be performed immediately is a job including private information or having a high level of importance, the user wants to cancel a print-standby state itself, and if possible transmission of the job itself, and also does not want to allow extra devices to record and manage the important documents, nor does not want to leave the history of the information.

Also, note that in the event of future advancement in environments in which a printer or the like is used for processing of secret documents or private documents such as with an electronic government, the aforementioned potential problems in secrets leaking need to be avoided all the more.

Further, in the event that the same processing and control is performed uniformly for solving the aforementioned problems and handling the aforementioned various requests, regardless of the content or type of the job to be processed, a new problem such as poorer user operability and the like occurs, but the present invention provides an arrangement for preventing such new problems.

According to an aspect of the present invention, a job processing method adapted to a system having a first information processing device capable of performing transmission processing of job data including at least one of first-type job data and second-type job data, which can be processed by a second information processing device is provided. The job processing method includes: enabling the first information processing device to inhibit transmission processing of the job data when the job data is first-type job data and the second information processing device is not ready to immediately execute processing of the job data; and enabling the first information processing device to permit transmission processing of the job data when the job data is first-type job data and the second information processing device is ready to immediately execute processing of the job data.

According to another aspect of the present invention, a system having a first information processing device capable of performing transmission processing of job data including at least one of first-type job data and second-type job data, which can be processed by a second information processing device is provided. The system includes: a generator adapted to generate the job data; and a controller adapted to inhibit the first information processing device from performing transmission processing of the job data when the job data is the first-type job data and the second information processing device is not ready to immediately execute processing of the job data, and permit the first information processing device from performing transmission processing of the job data when the job data is the first-type job data and the second information processing device is ready to immediately execute processing of the job data.

Further features and advantages of the present invention will become apparent from the following description of exemplary embodiments with reference to the attached drawings.

BRIEF DESCRIPTION OF THE DRAWINGS

FIG. 7 is a flowchart illustrating an example of first control processing procedures according to the present invention.

FIGS. 11A through 11D are diagrams illustrating an example of a Web submission tool screen to be displayed on the Web browser of the client computers illustrated in FIG. 1.

FIG. 17 is an explanatory diagram illustrating a memory map of a storing medium (recording medium) storing various types of data processing program that can be read by each device making up an image processing system to which an information processing device and image processing device according to the present invention can be applied.

DESCRIPTION OF THE EMBODIMENTS

First Embodiment

Description of embodiments of the present invention is provided in detail below with reference to the drawings.
General Description of System FIG. 1 is a conceptual configuration diagram of an image formation system to which a job processing system according to an embodiment of the present invention can be applied.

Figure 1:
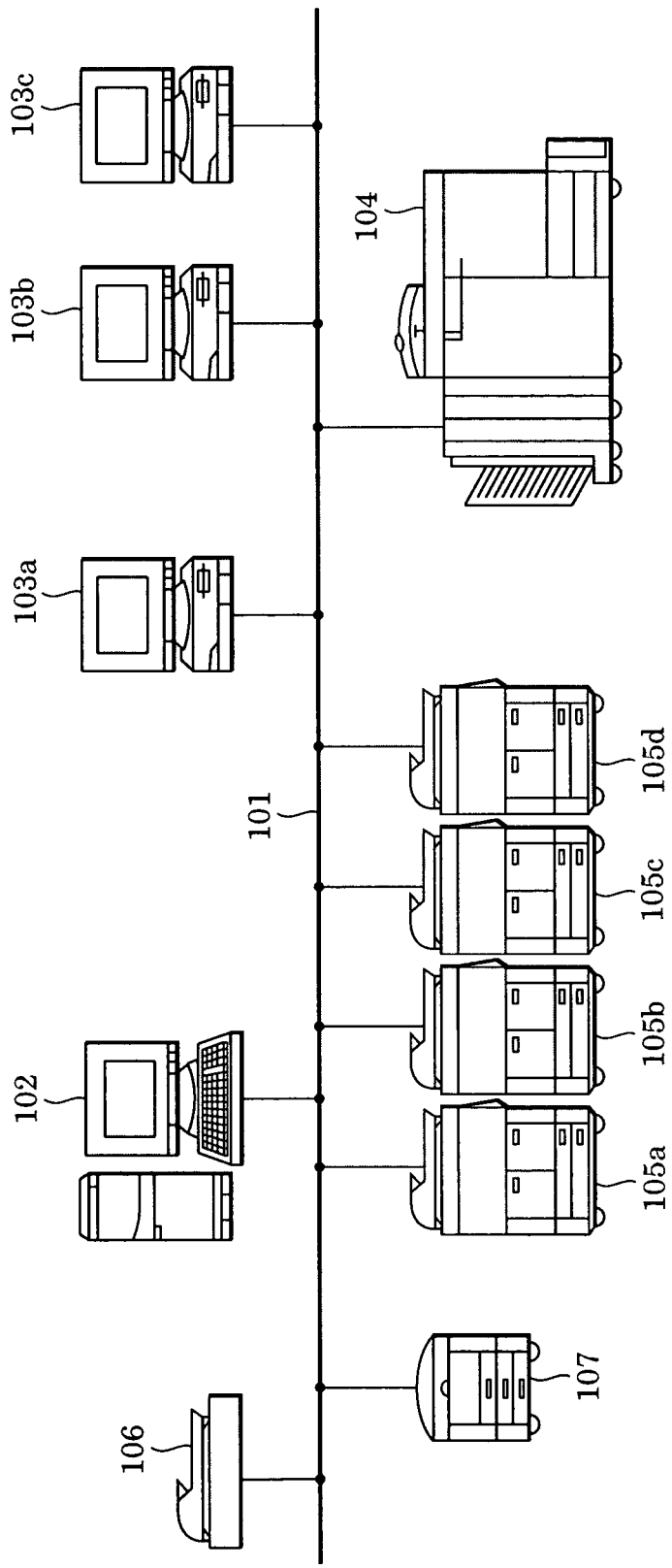
FIG. 1 is a conceptual configuration diagram of an image formation system according to an embodiment of the present invention.

A network 101 is shown in FIG. 1. A server computer 102 for performing job management and client computers (also referred to as PC) 103a, 103b, and 103c are connected to the network 101. Note that though not illustrated in FIG. 1, many client computers other than these are connected to the network 101. Hereinafter, reference numeral 103 representatively denotes the client computers.

Further, MFPs (Multi Function Peripherals) 104 and 105, a scanner 106, and a printer 107 are connected to the network 101. The color MFP 104 is an MFP capable of scanning, printing, and the like in full color, and the monochrome MFP 105 (105a, 105b, 105c, and 105d) is an MFP for performing scanning, printing, and the like in monochrome. Also, though not illustrated in FIG. 1, MFPs, scanners, and printers other than the aforementioned MFPs, or other apparatuses such as a FAX or the like can be connected to the network 101.

Here, application software for executing so-called DTP (Desk Top Publishing) is run on the client computer 103 so as to create/edit various types of documents/figures. The client computer 103 performs printout by converting a document/figure created into Page Description Language (PDL), and transmitting the PDL to the MFPs 104 and 105 via the network 101.

The MFPs 104 and 105 each have communication units capable of exchanging information via the server computer 102 and the network 101, which are configured so as to inform the server computer 102 or the client computer 103 via the server computer 102 of the information and state of the MFPs 104 and 105. Further, the server computer 102 (or client computer 103) has utility software for receiving information, and manages the MFPs 104 and 105.

The image processing system according to the present embodiment includes multiple printing devices such as the MFPs 104 and 105 and the like, multiple information processing devices such as the server computer 102, client computer 103, scanner 106, the scanner device of each MFP, and the like, capable of creating and generating job data that can be handled by printing devices such as the MFPs 104 and 105 and the like, which are configured so that job data transmitted from the multiple information processing devices can be selectively printed at any one of the multiple printing devices. Note that the printing devices of the present system such as the MFPs 104 and 105 each include a storage device (also simply referred to as memory) capable of storing a plurality of job data (also referred to as a plurality of series of image data) such as a hard disk device, which are configured so that the job data from the information processing devices capable of generating and transmitting job data such as the computers 102 and 103, each scanner device, and the like is stored and retained in the memory, the job data can be printed out at the printer unit of each device by reading out the job data in sync with timing in which printing can be performed. Note that each printer is configured so as to perform simultaneous parallel processing of multiple jobs using the memory such as the hard disk of each printer. For example, an arrangement may be made wherein even while reading and printing out certain job data from the hard disk of each device, the job data to be transmitted from the information processing device such as the computer or scanner or the like can be sequentially accepted, and these jobs are sequentially stored in the hard disk in a bitmap-expanded state, and the subsequent job data stored in the hard disk in parallel to printing actions of the previous job can be read out and printed out from the hard disk sequentially when printing actions of previously print job data are completed.

Thus, each printing device according to the present system is configured so as to allow parallel processing of multiple jobs, and also to allow the multiple jobs to be stored in the memory such as a hard disk or the like as printing-standby of jobs while another job is being printed, and also to allow at least these multiple jobs to be retained in the memory while printout actions cannot be performed due to previous printout actions being performed.

Also, an arrangement is made wherein job data can be received from various types of information processing devices such as a computer, scanner, or the like, and also can be stored and retained in the hard disk of each device not only in a case in which the printing device cannot execute printing processing of the job data at once due to at least any one of factors: an error relating to consumables including at least either a lack-of-toner state or lack-of paper state in the printing device; an error such as a paper jam in the printing device; an original document jam occurring at a scanner unit of the user's own device; and a power-off state of the printing device, but also in a case in which the printing device cannot execute printing processing of the job data at once since the printing device is in a waiting state for printing including at least any one of states: a temperature-adjusting state and image-quality adjusting state of the printing device, and a printing state in which the printing device is printing another job even if such errors do not occur, and the job data retained in the hard disk is sequentially read out and printed out from the hard disk in a case in which such a factor is solved (for example, in a case in which consumables such as toner, sheets, staples, or the like are replenished, in a case in which sheet jam is removed, in a case in which original document jam is removed by a user, or the like).

Note that in a case in which the printing device includes no memory such as a hard disk capable of storing data of multiple jobs, or even in a case in which the memory is included in the printing device, multiple jobs may be subjected to simultaneous parallel processing sequentially using large capacity memory such as the hard disk included in the server device or the like, in the same way as described above.

Also, with the present embodiment, description will be made principally regarding an MFP having multiple functions including a copy function and printer function as an example of a printing device, but the present embodiment is not restricted to this. For example, a single-function device (single function peripheral: SFP) such as a printing device having a print function alone for print job data transmitted from a computer, a printing device having a copy function alone for print job data to be transmitted from a scanner device, or the like, may be employed. Configurations of MFPs 104 and 105

Figure 2:
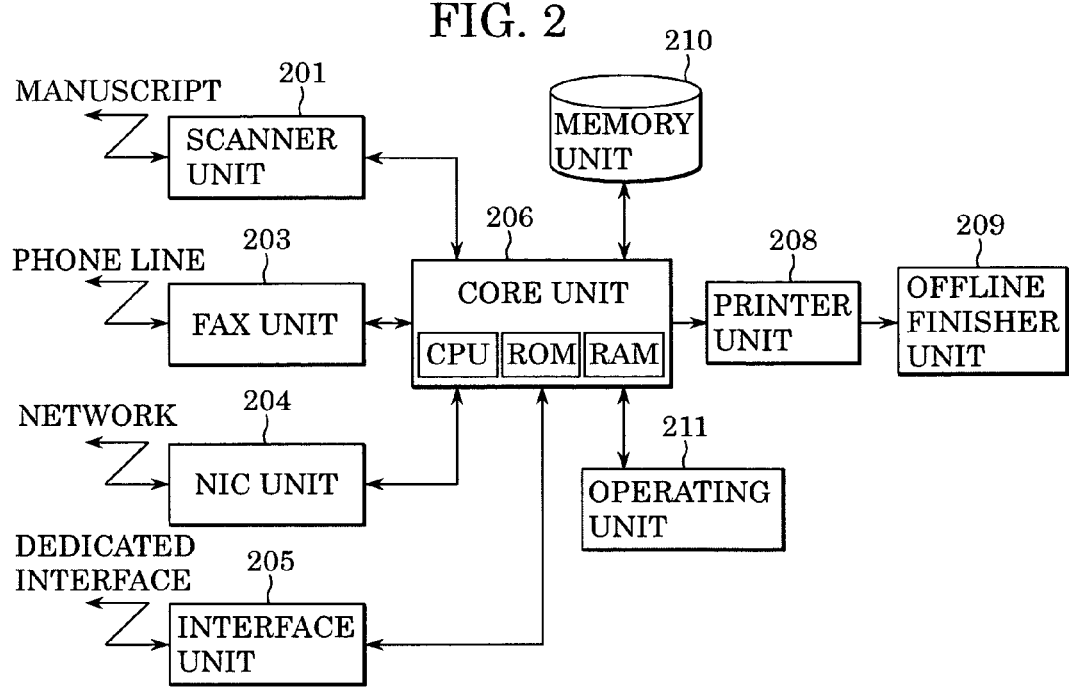
FIG. 2 is a block diagram illustrating the flow of data of the MFP illustrated in FIG. 1.
Figure 3:
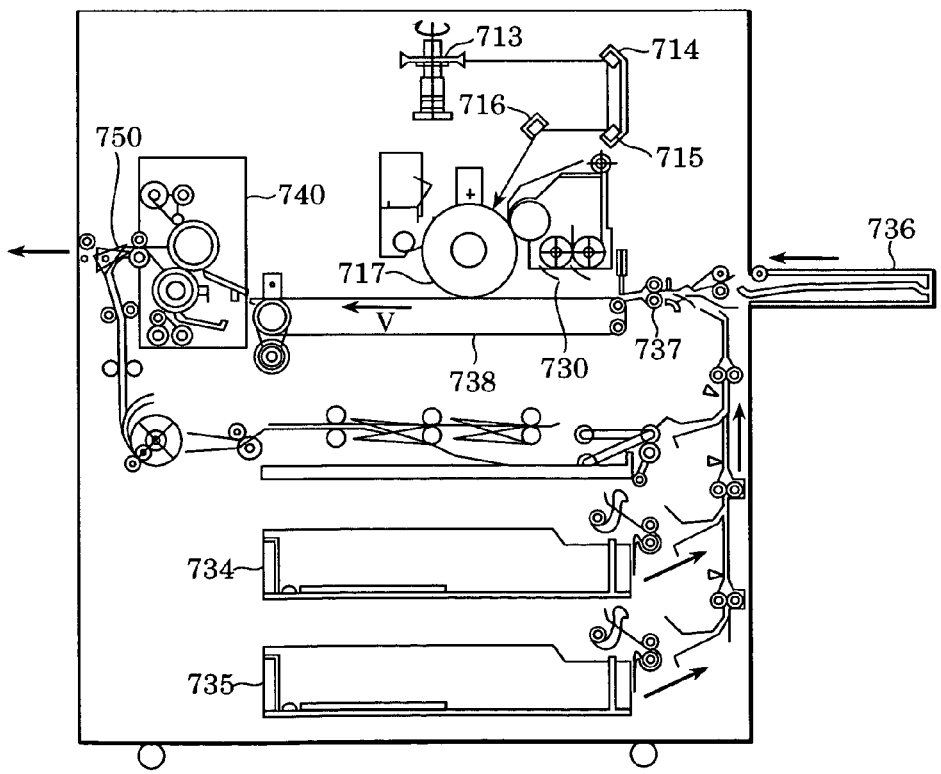
FIG. 3 is a cross-sectional view illustrating an example of the configuration of the printer unit illustrated in FIG. 2.

Next, description is made regarding the configurations of the MFPs 104 and 105 with reference to FIG. 2 and FIG. 3. The difference between the MFP 104 and the MFP 105 is the difference between full color and monochrome, and regarding parts other than color processing, full-color apparatuses often include the configuration of a monochrome apparatus, so description will be made focusing on the full-color apparatus, and description of the monochrome apparatus will be added as necessary.

FIG. 2 is a block diagram illustrating the flow of data of the MFPs 104 and 105 illustrated in FIG. 1. As illustrated in FIG. 2, the MFPs 104 and 105 each include a scanner unit 201 for reading images and subjecting the read image data to image processing, a FAX unit 203 for transmitting/receiving images using a phone line represented by a facsimile, a NIC (Network Interface Card) unit 204 for exchanging image data and device information using the network, and a dedicated interface unit 205 for exchanging information with the other devices and media. Data from the respective units 201 through 205 is temporarily collected at a core unit 206, and the image data output from the core unit 206 is transmitted to a printer unit 208 for performing image formation. Recording media printed out at the printer unit 208 are fed to a finisher unit 209, where sorting and finishing of the recording media are performed.

Here, the core unit 206 performs traffic control of the bus, and path switching is performed according to the use (function) of the MFP as shown in the following (A) through (I) and the like. Also, it is generally known that compression data such as JPEG, JBIG, ZIP, or the like is employed when data passes through the network, and data is decompressed (expanded) at this core unit following entering the MFP.

The path in each function of the MFP is shown below.
(A) Copy function: scanner unit 201→core unit 206→printer unit 208
(B) Network scanner function: scanner unit 201→core unit 206→NIC unit 204
(C) Network printer function: NIC unit 204→core unit 206→printer unit 208
(D) Facsimile transmission function: scanner unit 201→core unit 206→FAX unit 203
(E) Facsimile reception function: FAX unit 203→core unit 206→printer unit 208
(F) Box reception function 1: NIC unit 204→core unit 206→memory unit 210
(G) Box reception function 2: scanner unit 201→core unit 206→memory unit 210
(H) Box transmission function 1: memory unit 210→core unit 206→NIC unit 204
(I) Box transmission function 2: memory unit 210→core unit 206→printer unit 208

Here, the term "box reception/box transmission" means inputting and storing of data, and outputting of stored data using the memory unit 210 having memory (such as a hard disk device or the like) capable of storing data of multiple jobs and is a function for dividing memory for each job or each user, saving data temporarily in the memory, and performing transmission/reception of data by combining a user ID and a password therewith. An operating unit 211 includes a display unit having a touch panel through which various types of operating can be input.

The core unit 206 includes a central processing unit (CPU), read-only memory (ROM), random access memory (RAM), and so forth, and the CPU performs overall control of the MFP by loading a program stored in the ROM or the like to the RAM and executing the program.

In general, data input from the NIC unit 204 to the core unit 206 is made up of PDL (Page Description Language) data and JCL (Job Control Language) data, and these are expanded in a bitmap image with an appropriate size and resolution at a RIP (Raster Image Processor) (not shown) within the core unit 206.

FIG. 3 is a cross-sectional view illustrating an example of the configuration of the printer unit 208 shown in FIG. 2, and particularly corresponds to the monochrome MFP 105.

In FIG. 3, a polygon mirror 713 receives a laser beam emitted from a semiconductor laser. The laser beam scans and exposes a photosensitive drum 717 via mirrors 714, 715, and 716.

A developing apparatus 730 supplies black toner, which forms a toner image on the photosensitive drum 717 in accordance with the laser beam, and the toner image is transferred on a sheet to obtaining an output image.

A sheet fed from any one of sheet cassettes 734 and 735, and a manual feed tray 736 is adsorbed onto a transfer belt 738 via a resist roller 737. Toner developing on the photosensitive drum 717 is performed beforehand, and upon a sheet being conveyed, the toner is transferred to the sheet in sync with the timing of feeding.

The sheet on which the toner is transferred is separated, and the toner is fixed on the sheet by a fixer 740. The sheet passing through the fixer 740 is first guided in the lower direction by a flapper 750, and upon the trailing edge of the sheet passing through the flapper 750, the sheet is switched back so as to be discharged. Thus, the sheet is discharged in a face-down state, and the page sequence thereof is the correct page sequence when printout is performed sequentially from the first page.

Note that description has been made regarding the case in which the printer unit 208 employs the laser beam method as an example, but the present invention may be applied to any other printout method besides the laser beam method, such as electrophotographic method (LED method, for example), liquid crystal shutter method, ink-jet method, thermal-transfer method, sublimation method, and so forth.

Client Computer

Figure 4:
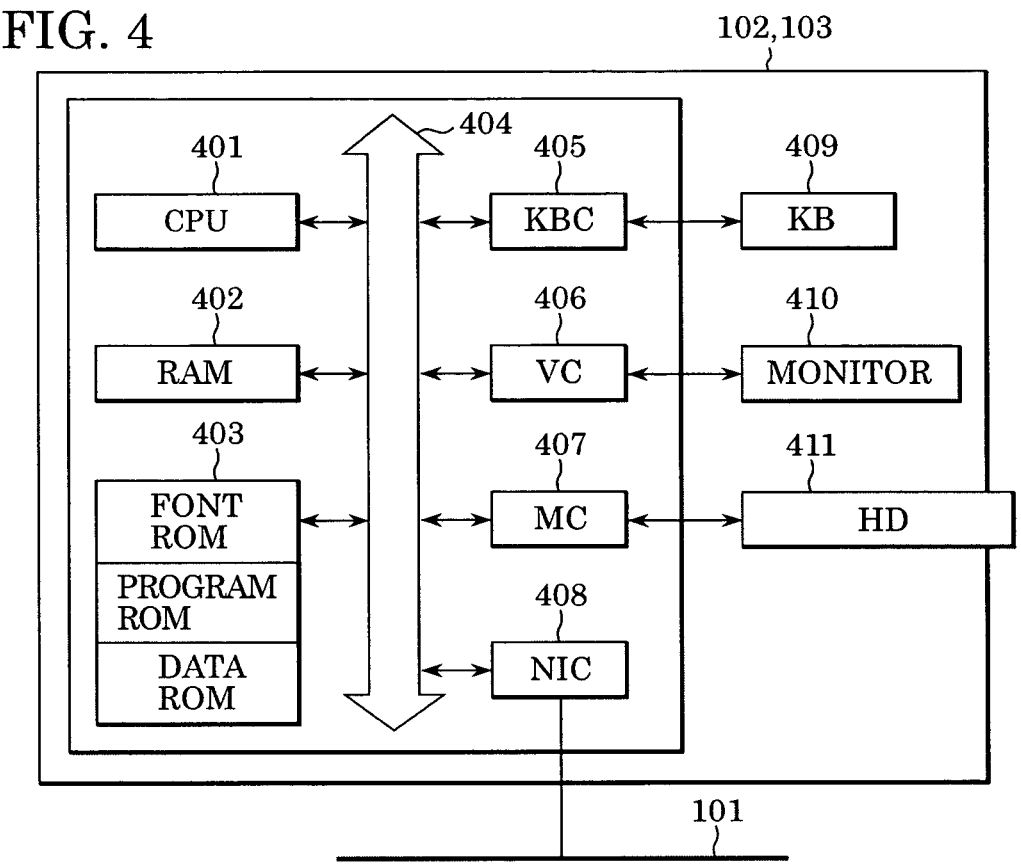
FIG. 4 is a block diagram illustrating an example of the configuration of the server computer and client computers illustrated in FIG. 1.

Next, description is made regarding the configuration of the server computer 102 and client computer 103 illustrated in FIG. 1 with reference to FIG. 4. FIG. 4 is a block diagram illustrating an example of the configuration of the server computer 102 and client computer 103 illustrated in FIG. 1.

In FIG. 4, a CPU 401 performs overall control of the device by loading a program stored in the program ROM of ROM 403 or a later-described hard drive (HD) 411 or the like, executing the program, and controlling devices connected to a system bus 404.

Also, font data or the like is stored in the font ROM of the ROM 403, and various types of data are stored in the data ROM of the ROM 403. A RAM 402 serves as the main memory of the CPU 401, work area, and the like.

A keyboard controller (KBC) 405 controls input from a keyboard (KB) 409, pointing device (not shown), for example, input from a mouse. A video card (VC) 406 controls display of a monitor (display unit) 410, such as an LCD or the like.

A hard disk (HD) 411 stores various types of program (including an operating system (OS), various types of application program, printer drivers such as the MFPs 104 and 105, printer 107, and the like, a scanner driver of the scanner 106, and the like) to be executed by the CPU 401 so as to be executed. A memory controller (MC) 407 controls access to the hard disk (HD) 411.

A network interface card (NIC) 408 controls communication with the network 101. Note that the server computer 102 does not always need to include the KB 409, monitor 410, and the like illustrated in FIG. 4.

Printer Driver

Figure 5:
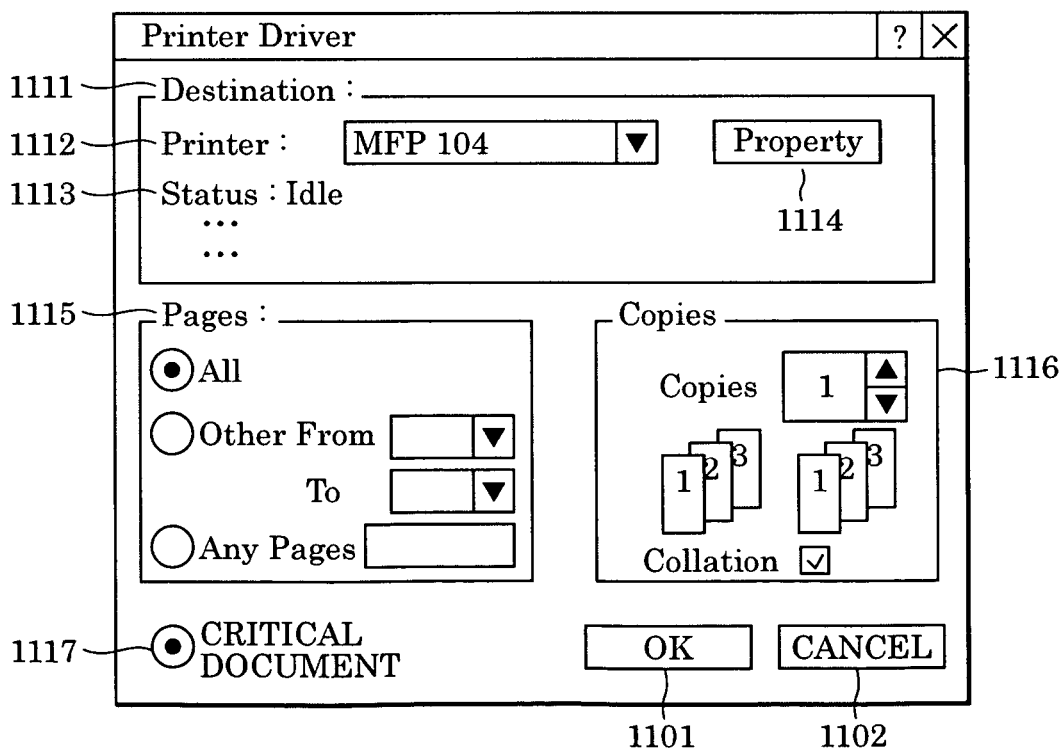
FIG. 5 is a diagram illustrating an example of a printer driver screen to be displayed on the monitors of the client computers illustrated in FIG. 1.
Figure 6A:
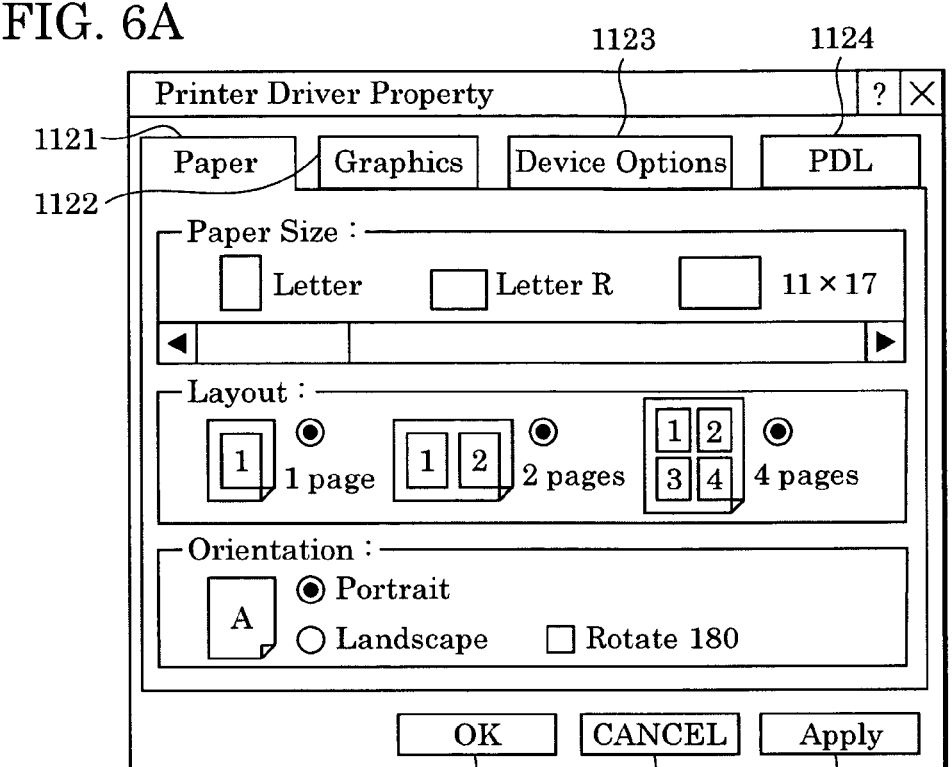
FIGS. 6A and 6B are diagrams illustrating an example of a printer driver screen to be displayed on the monitors of the client computers illustrated in FIG. 1.
Figure 6B:
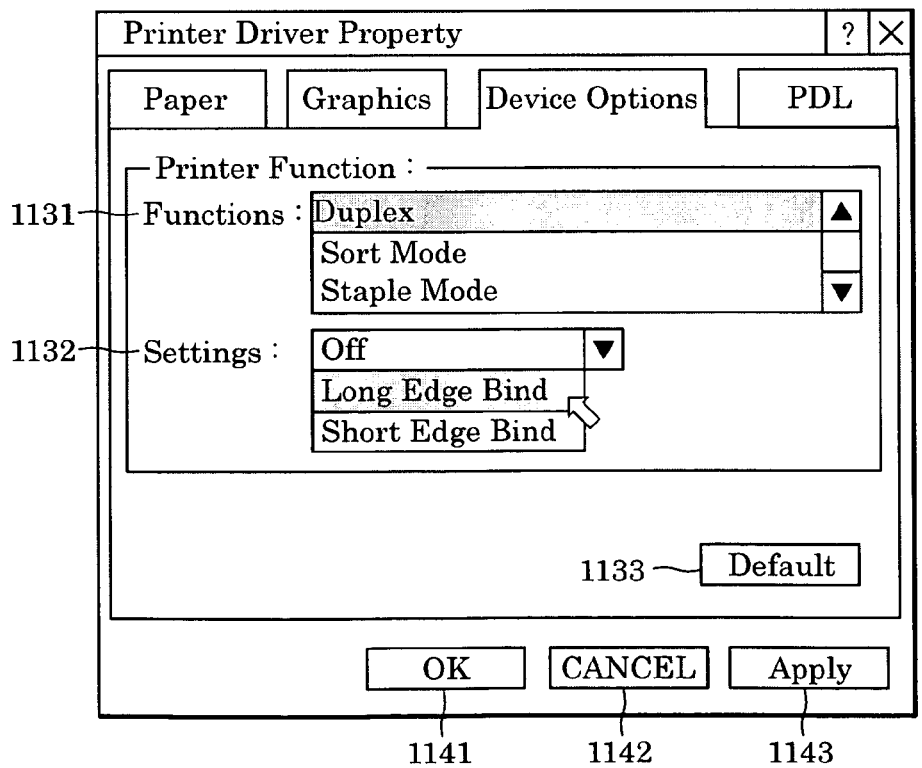

FIGS. 5 and 6A and 6B are diagrams illustrating an example of a printer driver screen to be displayed on the monitor 410 in the client computer 103 serving as an example of the information processing devices illustrated in FIG. 1. Note that with regard to various types of operating screens including this operating screen for remote-operating each printing device present in the present system, to be displayed on the display device of the computer with the present embodiment, the control unit (CPU 401 in FIG. 4, for example) included in the computer performs display control, and allows the user to input various types of instructions via various types of operating screens displayed on the display unit 410. The control unit of the information processing device controls the device itself, and other devices, such as the printing device or the like, capable of data communication to execute an operation corresponding to the instruction input via the operating screen of the information processing device by the user.

The printer driver is configured so as to transmit the desired image to a destination such as a printer via a certain communication medium, for example, a network, by the user specifying the desired setting parameters on the GUI (GUI displayed in a case in which the user specifies display of property regarding a "printer" on the print-setting GUI displayed when the user specifies printing from an application or the like) for specifying printing operation.

FIG. 5 corresponds to the window of the printer driver for controlling the control unit (CPU 401) of the information processing device to control the display unit 410 of the information processing device such as the PC 102, 103, or the like for display. This screen is configured so that the user can set various types of printing conditions via the operating unit such as the keyboard, mouse, or the like at the time of print job data on the user desired printer. For example, with the setting items within the window of this printer driver, a destination setting item 1111 is used for denoting an output destination serving as a target, a transmission destination selection field 1112 is used for denoting a selection field of a transmission destination (printer) to be selected by the user, and a status setting field 1113 is used for denoting a status display illustrating the state of the selected printer. With the present embodiment, the MFPs 104 and 105 illustrated in FIG. 1 become selection targets, and the user can select the target using the KB 409 or mouse (not shown) or the like of the client computer 103.

A page setting item 1115 is used for selecting output pages within a job, and allows the user to determine which page of images created by the application software that runs on the client computer 103 the user wants to output via the setting items.

A number-of-copies setting item 1116 is used for specifying the number of copies, and allows the user to increase/decrease the number of copies of job data to be output at the printing device specified by the user via the transmission destination selection field 1112 by clicking the arrow (arrow of a scroll bar) illustrated in the drawing, or setting the number-of-copies manually via the number-of-copies setting item 1116. A critical document button 1117 is used for setting a critical document mode to a print job. Note that the critical document mode may be set as default setting for each registered printer (printer object). In other words, in the event that the user specifies a printer (printer object) to which the critical document mode is set, and instructs printing, the job enters the critical document mode automatically without the user intentionally setting the critical document mode. In the event that the user inputs a printing start instruction at the PC (for example, in a case in which an OK key 1101 on the screen in FIG. 5 is depressed by the user) while the user has set an instruction indicating a critical document at this critical document setting item field (critical document button) 1117 (for example, the critical document specification is in an on-state by clicking the critical document button 1117), the control unit (in this example, the CPU 401 of the PC, note that the control unit of another device other than the PC may be employed, such as the CPU of the server device, the CPU of the printer, or the like) determines that the print job data to be transmitted from the PC is data with a high level of importance (also referred to as critical document data) with reference to the setting state of the critical document button 1117. On the other hand, in the event that the user inputs a printing start instruction at the PC (for example, in a case in which the OK key 1101 on the screen in FIG. 5 is depressed by the user) while the user has not set an instruction indicating a critical document at this critical document button 1117 (for example, the critical document specification is in an off-state by removing a check), the control unit (in this example, the CPU 401 of the PC, note that the control unit of the other device other than the PC may be employed, such as the CPU of the server device, the CPU of the printer, or the like) determines that the print job data to be transmitted from the PC is not data having a high level of importance (also referred to as critical document data) with reference to the setting state of the critical document button 1117. In either case, later-described operations can be selectively performed. Note that with the present embodiment job data having a high level of importance is referred to as first-type job data, and job data not having a high level of importance is referred to as second-type job data.

A property setting key 1114 is used for performing detailed settings regarding the transmission destination device (printer) selected in the transmission destination selection field 1112, upon the user specifying (clicking) the Property key 1114, the control unit of the PC controls the display unit 410 to display a property setting screen illustrated in FIG. 6A or 6B or the like.

In the event that the user completes all of the desired settings, and inputs a printing start instruction by depressing (clicking) the OK key 1101, in response to this, the control unit of the PC controls the printing device specified by the user via the transmission destination selection field 1112 to print the job data to be printed within the memory of the PC based on the printing conditions set by the user via the various types of user interface screens including the UI in FIG. 5. Note that in the event that the user inputs a printing start instruction by depressing the OK key 1101, the control unit (here, CPU 401) controls so as to change the subsequent operating screen control and printing operation control depending on a case in which the critical document specification is set via the critical document button 1117, and a case in which the critical document specification is not set via the critical document button 1117. Printing can be canceled by depressing a Cancel key 1102.

FIGS. 6A and 6B correspond to property setting screens (GUI display screens) at the time of selecting the Property key 1114 illustrated in FIG. 5, and the same items between FIGS. 6A and 6B are represented with the same reference numerals.

With this property setting screen, for example, a paper tab 1121, a graphics tab 1122, a device option tab 1123, a PDL tab 1124, and the like are provided. Different setting content can be set by clicking these tabs (or specifying these tabs with a pointing device (not shown) or the like).

In FIG. 6A, the paper tab 1121 is shown as an example. With this paper tab 1121, a sheet size, imposition layout, orientation of sheets, and the like can be set. Selecting the device option tab 1123 allows the user to perform more detailed adjustment relating to image processing for changing setting parameters unique to the device such as setting of finishing such as staples, setting of color according to the printer, and so forth.

In FIG. 6B, the device option tab 1123 is shown as an example. With this device option tab 1123, each printing function such as a both-sided printing function, sort function, staple function, and the like can be set. The user can select the desired function in a function field 1131 and a setting value in a settings field 1132. A Default key 1133 returns each setting value to a default value.

Also, though not illustrated in the drawings, resolution and halftone settings can be set with by selecting the graphics tab 1122, and a PDL output format or the like can be set by selecting the PDL tab 1124, in the same way as the above-described paper tab 1121 and device options tab 1123.

As described above, the user can set various types of printing conditions via multiple setting screens so as to print the user's desired data on the printing device specified by the user.

Upon the user depressing (specifying) an OK key 1141, with a pointing device (not shown) or the like, the CPU 401 activates the property settings on the property setting screen, and returns display to the screen (the window of the printer driver) illustrated in FIG. 5.

Upon the user depressing (specifying) a Cancel key 1142, the CPU 401 inactivates the property settings on the property-setting screen, and returns display to the screen (the window of the printer driver) illustrated in FIG. 5.

Upon the user depressing (specifying) an Apply key 1143, the CPU 401 activates the property settings on the property-setting screen without changing the screen.

The printer driver can normally input setting values unique to a device displayed on the device option tab 1123, or the like, and a PPD (PostScript® Printer Description) file or the like prepared beforehand generally needs to be set in the printer driver regarding setting values unique to a device.

With a PPD file, setting items for controlling the printer and the default values thereof, whether or not a combination of settings is available, and the like, are described therein. The PPD file is provided as a unique file for each printer. The user needs to prepare for linking the PPD file with the printer driver within the user's own computer beforehand.

Print Sequence According to Present Embodiment

Description is made below regarding the print sequence according to the present embodiment with reference to the flowchart in FIG. 7.

FIG. 7 is a flowchart illustrating an example of first control processing procedures according to the present invention, and corresponds to a print sequence according to the first embodiment of the present invention. In exemplary embodiments following sequence is executed at the client computer 103 as an example of the information processing device. Note that the processing of this flowchart is realized by the CPU 401 within the computer 103 illustrated in FIG. 4 loading a program stored in the HD 411 on the RAM 402, and executing the program.

First, the user inputs a printing instruction when he/she wants to perform printout with application software. In response to this printing instruction, processing begins at Step S1201 and the CPU 401 controls the monitor 410 to display the printer driver window illustrated in FIG. 5. Then, the CPU 401 activates the printer driver corresponding to the printer selected in the destination setting item 1111 (specified destination printer).

Upon the user selecting (e.g., depressing) the Property setting key 1114 illustrated in FIG. 5, the printer driver executed by the CPU 401 (hereinafter, simply referred to as "printer driver") displays the property-setting screen illustrated in FIG. 6.

Next, the printer driver accepts the output condition settings regarding a printer and job as to the aforementioned PPD setting items from the user via the various types of printing condition setting screen illustrated in FIGS. 5 through 6B until the user inputs an output instruction (and selects (depresses) the OK key 1101 in FIG. 5) (Step S1202). In Step S1203, the printer driver determines whether an output instruction has been input. If it is determined in Step S1203 that an output instruction has not been input (no in Step S1203), processing returns to Step S1202. On the other hand, if it is determined in Step S1203 that an output instruction has been input (yes in Step S1203), the printer driver performs job analysis (including processing for determining whether the job data to be printed is the first-type job data or the second-type job data) in Step S1204.

At this time, in Step S1205, the printer driver determines whether or not the job to be printed is a specific-type job by checking whether the job to be printed is a job to which the critical document mode is set by the critical document button 1117 illustrated in FIG. 5, a specific job prepared with the PPD file, a job to which color printing is specified, a job to which watermarked image output is specified, a job input from the specific PC, or the like. If the printer driver determines that the job to be printed is not a specific-type job (in the event of determining that the job to be printed is the second-type job data), the flow proceeds to Step S1212, where the printer driver permits transmission of the job of which an output instruction input by the user at the operating unit of the PC 103 in Step S1203 as the aforementioned general print job (second-type job data), controls the print job to transmit to the specified destination printer, and then ends the processing.

On the other hand, in the event that the printer driver determines, in Step S1205, that the job to be printed is a specific-type job (in the event of determining that the job to be printed is the first-type job data), processing proceeds to Step S1206 and the printer driver issues (transmits) a status request serving as a command for requesting the status information of the printing device selected as a printing destination including the operating status information of the printer (information for determining whether or not power is turned on, information indicating that an error does not occur, and in the event of an error occurring, further including information for identifying what kind of error occurs, and information indicating presence of materials consumed such as sheets, toner, staples, and the like) and job status information (information for identifying whether or not printout is being performed, information for identifying how many jobs are in a print-standby state, and the like) to the corresponding printer (the printing device selected on the transmission destination selection field 1112 of the operating screen in FIG. 5 by the user) so as to request the current printer state (whether the printer is in a warming-up state or in an error state, the amount of consumables, the number of print jobs in a print-standby state, and the like). The printer side requested determines whether or not the printer itself is in an immediately-printable state (i.e., whether or not the temperature adjustment of the fixing device is adjusted, whether or not the printer is in a down state due to jam or an error, whether or not a great number of jobs are queued, as well as whether or not the printer is in a standby state waiting for a job), and returns the status information thereof to the printer driver side. The printer driver receives and confirms the status information. An arrangement may be made wherein the status information of the management table of each printer stored within the client computer 103 is updated at this time.

Next, in Step S1207, the printer driver determines whether or not the specified destination printer is in an immediately-printable state based on the status confirmation processing in Step S1206. In the event that the printer driver determines that the printer is in an immediately-printable state (yes in Step S1207), the flow proceeds to Step S1212, where the printer driver permits transmission of the job (this job is the first-type job data) of which the output instruction is input by the user through the operating unit of the PC 103 in Step S1203, controls the print job to be transmitted to the specified destination printer, and ends the processing.

Figure 8:
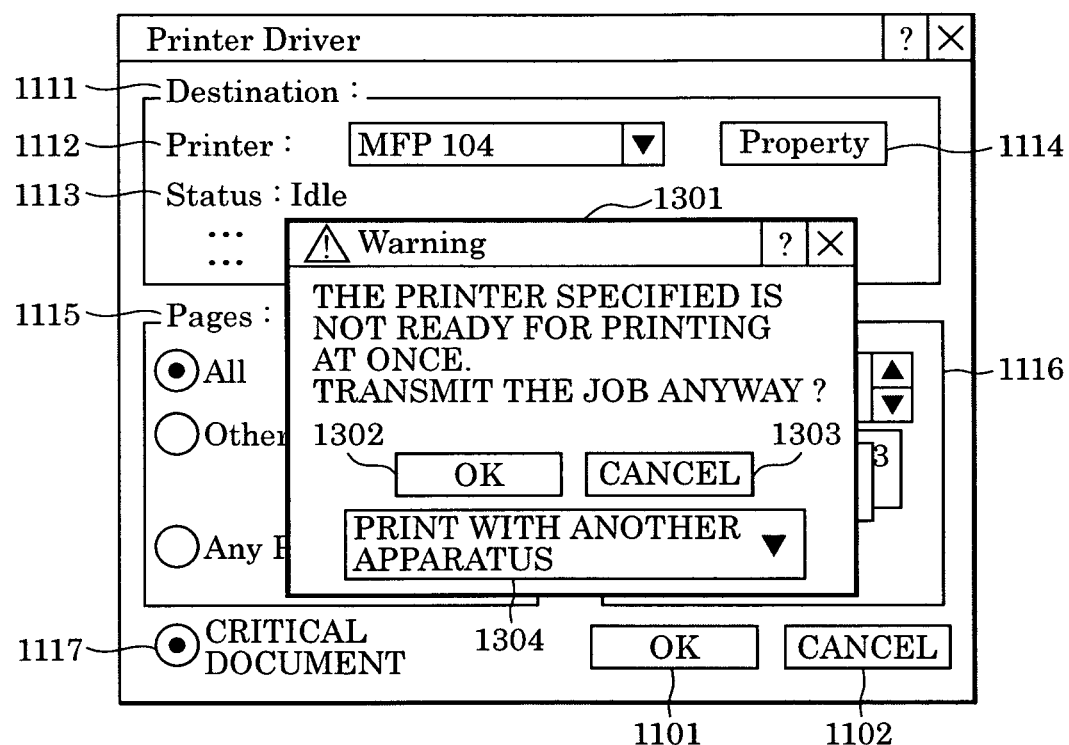
FIG. 8 is a diagram illustrating an example of a warning UI (user interface) to be displayed on the monitors of the client computers illustrated in FIG. 1.

On the other hand, in the event that the printer driver determines that the printing device selected by the user via the transmission destination selection field 1112 cannot print the print job serving as the first-type job data immediately (no in Step S1207), the printer driver controls the display unit 410 of the PC 103 to display a UI screen 1301 that warns or calls attention to the user as illustrated in FIG. 8 (Step S1208), and asks the user of the PC 103 to determine whether or not the job should be transmitted (permitted/inhibited).

FIG. 8 is a diagram illustrating an example of a warning UI screen to be displayed on the monitor 410 under control of the CPU 401 in the client computer 103 illustrated in FIG. 1. The control unit (CPU 401) of the PC transmits, to the printer selected by the user of the PC via the transmission destination selection field 1112 of the operating screen in FIG. 5, a status request command for requesting the status information of the printer under the condition that the user of the PC specifies job data as the critical document data (first-type job data) via the critical document button 1117 on the operating screen of the PC in FIG. 5, and then inputs a printout start instruction via the OK key 1101 on the screen in FIG. 5. Then, the control unit of the PC obtains the status information from the printer as a reply result. In the event that the control unit of the PC determines that the printing device specified by the user of the PC is not in an immediately-printable state regarding this job (first-type job data) (also referred to as a case of determining that the printer is in a first state meaning that the printer is not in an immediately-printable state regarding the first-type job data) by checking the obtained status information, the control unit of the PC controls the display unit 410 to display an operating screen 1301, such as the one illustrated in FIG. 8, including: guide information for allowing the control unit of the PC to inform the user that the printer specified by the user is not in an immediately-printable state regarding this job (first-type job data); an OK key 1302 for allowing the user to input an instruction for permitting transmission of the job (first-type job data) from the PC so as to print the job (first-type job data) using the printing device following the user confirming the guidance display; a Cancel key 1303 for allowing the user to input an instruction for inhibiting transmission of the job from the PC so as not to print the job (first-type job data) using the printing device following the user confirming the guidance display; a Print-With-Another-Apparatus key 1304 for allowing the user to input an instruction for inhibiting the print job to be transmitted to the printing device selected by the user, but permitting transmission of the job using the other printing device (the other printing device present in this system other than the printing device selected by the user on the screen in FIG. 5), as display components. The user can permit/inhibit transmission of the first-type job data to be printed using the printing device specified by the user, or inhibit transmission of the first-type job data to be printed using the printing device specified by the user but permit transmission of the first-type job data to be printed using the other printing device capable of printout, through this operating screen 1301.

In this case, with the UI 1301 warning the user illustrated in FIG. 8, in the event that the user wants to continue print operations using the printer (printing device selected by the user via the transmission destination selection field 1112) of this print job (equivalent to the first-type job data) even if the printer cannot print the job immediately, the user clicks (specifies) the OK key 1302. In the event that the user wants to quit transmission of the job as to the printing device selected by the user via the transmission destination selection field 1112, the user clicks (specifies) the Cancel key 1303. In the event that the user wants to perform other processing, the user can select processing such as clicking (specifying) the Print-With-Another-Apparatus key 1304 or the like.

Note that the control unit (CPU 401) of the PC inhibits the display unit 410 of the PC from displaying the this screen 1301 in FIG. 8 in the event that the control unit of the PC transmits the aforementioned status request command to the printer selected by the user of the PC via the transmission destination selection field 1112 on the operating screen in FIG. 5 under the condition that the user has specified the job to be printed as the critical document data (first-type job data) via the critical document button 1117 on the operating screen in FIG. 5 of the PC, and then inputs a printout start instruction via the OK key 1101 on the screen in FIG. 5, the control unit of the PC checks the status information received from the printer as a reply result, and determines that the printing device specified by the user is in an immediately-printable state regarding this job (first-type job data) (also referred to as a case of determining that the printer is in a second state meaning that the printer is in an immediately-printable state regarding the first-type job data). Then, the control unit of the PC does not allow the user to select permission/inhibition of transmission of the job (first-type job data) via the button 1302 or 1303, and controls (allows) the job to be transmitted from the PC to print the job using the printing device (printing device selected by the user via the transmission destination selection field 1112 in FIG. 5). In other words, if it is determined that the designated destination is ready for printing immediately (yes in Step S1207), the flow is controlled so as not to proceed to the processing in Step S1208, and processing proceeds to Step S1212.

Also, with the determination in Step S1205, in the event that the control unit (CPU 401) of the PC 103 determines that the job data to be printed is not a specific-type job (in the event that determination is made that the job data is the second-type job data), the flow is controlled so as not to proceed to the processing in Step S1206, the processing itself for transmitting a status request to the printing device specified from the PC 103 is inhibited, the processing at the PC 103 for receiving the status information from the printing device, the processing at the PC 103 for confirming the status, and displaying the screen 1301 illustrated in FIG. 8 including information indicating that the specified printing device cannot print the job data immediately based on the status information on the display unit 410 are inhibited, upon the user inputting a printout start instruction by depressing of the OK key 1101 on the operating screen in FIG. 5, the control unit of the PC allows this job (second-type job data) to be transmitted from the PC, and controls the printing device (printing device specified in FIG. 5) to perform printout processing in accordance with the printout conditions set via the operating screens in FIG. 5 and FIGS. 6A and 6B regarding the job when the job can be printed on the printing device side. In other words, if it is determined in Step S1205 that the job is not a specific type of job (no in Step S1205), the flow is controlled so as not to proceed to the processing in Step S1206, but rather proceed to the processing in Step S1212. Thus, in the event that the job data to be printed is the second-type job data, the control unit (CPU 401) of the PC 103 activates a status monitor function automatically, and inhibits operations such as obtaining the status of the specified printing device, and the like.

On the other hand, in the event that the job data to be printed is the first-type job data, the control unit (CPU 401) of the PC 103 activates a status monitor function automatically, and permits operations such as obtaining the status of the specified printing device, and the like. In other words, if it is determined in Step S1250 that the job is a specific type of job as described above (yes in Step S1205), the flow is controlled so as to proceed to the processing in Step S1206.

Note that an arrangement may be made wherein even if the job data to be printed is the second-type job data, in the event that a status monitor function independent from the aforementioned function by the control unit (CPU 401) of the PC for confirming the state of a printer is provided, the user inputs an instruction for activating the status monitor by manual operations via the operating unit of the PC, the control unit (CPU 401) of the PC allows a series of procedures to confirm the state of the printer on the PC side. Thus configured, an advantage for providing a user-friendly arrangement corresponding to various requests from users can be improved further (this processing is not shown).

In Step S1209 (of FIG. 7), the printer driver determines whether or not the user has specified the OK key 1302 on the operating screen 1301 in FIG. 8, and in the event that determination is made that the user has specified the OK key 1302, the flow proceeds to Step S1212, where the printer driver allows this job (first-type job data) to be transmitted even if the printing device selected by the user on the operating screen in FIG. 5 is not in an immediately-printable state, reads out the print job from the memory of the PC, transmits the job to the specified destination printer via a certain communication medium such as a network or the like, and then ends the processing. In this case, the printer driver controls the printer side to store and retain the print job in the memory such as a hard disk or the like until the print job enters a printable state. When the print job enters a printable state (e.g., in the event that an error is solved, consumables are supplied, the other jobs stored in the print-standby queue are all printed, or the like), the printer driver reads out the job (first-type job data) from the hard disk, and controls the printer unit of the user's PC to print the job in accordance with the printout conditions set by the user via the operating screens on the PC side in FIG. 5 and FIGS. 6A and 6B.

On the other hand, in the event that the printer driver determines that the user has not specified the OK key 1302 in Step S1209, the printer driver determines whether or not the user has specified the Cancel key 1303 in Step S1210. In the event that the printer driver determines that the user has specified the Cancel key 1303 (yes in Step S1210), the flow proceeds to Step S1213, where the printer driver reads out the print job (first-type job data) from the memory of the PC 103, inhibits transmission to the printing device (job cancel), and ends the processing. Thus, the printer driver inhibits transmission of this print job (first-type job data) itself stored in the PC 103 for printout processing since the printing device cannot perform printout immediately to the outside of the PC 103, and also inhibits storing itself of the first-type job data stored on the PC 103 side in the external memory (in this example, the hard disk in the printing device is employed, however, the memory in the server device may be employed instead).

On the other hand, in the event that the printer driver determines that the user has not specified the Cancel key 1303 (no in Step S1210), the printer driver determines whether or not the user has specified the Print-With-Another-Apparatus key 1304 in Step S1211, and in the event that the printer driver determines that the user has specified the Print-With-Another-Apparatus key 1304, the flow proceeds to Step S1214, where the printer driver allows the user to specify another printer, and performs processing to reroute to another printer specified by the user, and ends the processing. In this case, the job data (first-type job data) is transmitted for printout processing by another printing device, but the job data is not transmitted to a printing device which cannot immediately print the print job. In other words, in the event of performing this processing, another printing device is preferably a printing device which can print the print job immediately.

On the other hand, in the event that the printer driver determines that the user has not specified the Print-With-Another-Apparatus key 1304 in Step S1211, the printer driver controls the flow to return to Step S1209.

As described above, with an environment in which a job is output from a computer to a printer using the printer driver, conventional wasteful labor can be eliminated in which following a job being output to a printer, a user finds out that the printer is not ready, and cancels the job so as to output the job to another printer, and also waiting time as with conventional arrangements wherein the user remains worried about secrets leaking, private information leaking, and the like, until a job is processed, can be prevented in the event that the user has accidentally output a print job such as a secret document, private document, or the like to a printer which cannot print the job immediately. In other words, a print job including secret information, private information, or the like, can be prevented from exposure to risks of secrets leaking or private information leaking by the print job being stored in a printing device (MFP, printer, or the like) for a long period.

An arrangement has been made wherein in Step S1207, the printer driver determines whether the specified destination printer is in an immediately-printable state based on the status confirmation processing in Step S1206. In the event that the printer driver determines that the printer is not in an immediately-printable state, the printer driver displays the UI 1301 warning the user as illustrated in FIG. 8 so as to ask the user to determine whether to continue the print job to be output to the specified printing device. However, an arrangement may be made wherein even if the specified destination printer is in an immediately-printable state, even in the event that the printer is in a state in which a job cannot be completed (in the event that the number of sheets, the amount of toner, the number of staplers, or the like cannot satisfy the amount necessary for completing a job, for example), the printer driver displays the UI 1301 warning the user as illustrated in FIG. 8 so as to ask the user to determine whether to continue the job to be output to the specified destination printer.

Second Embodiment

With the first embodiment, description has been made regarding an arrangement wherein a printout instruction is issued to the printing device such as the MFP or the like from the client computer 103 using the printer driver. However, an arrangement may be made wherein a printout instruction is issued to the printing device such as the MFP or the like from the client computer 103 using another printout instructing method. Such an arrangement according to the second embodiment is described in detail below.

Web Submission

Examples of a method for issuing a printout instruction to the MFP or the like from the client computer 103 include a submission tool (also referred to as a downloader or submitter), and dragging-and-dropping a file into a hot folder. The submission tool is a tool for inputting a job to the server device or printing device such as the MFP or the like. In the example described below, description is made regarding a Web submission using the HTTP protocol, although other protocols can be used.

The Web submission is a method for specifying a file such as a PDF or the like from the client side, and transferring the file to the RIP side directly via the Web, and is a tool for specifying a printer setting item (setting item generally equivalent to the aforementioned PPD setting) called as a job ticket using a Web UI, and inputting the setting item along with a data file.

On the other hand, the hot folder needs to be set by the user beforehand since the user drags and drops a file into a share folder prepared beforehand, but successive job ticket settings (printout condition settings for identifying which printout condition is used for printing a print job) are not provided. This is very convenient for issuing a complex setting instruction, and inputting a great number of files with the same job ticket.

Figure 9:
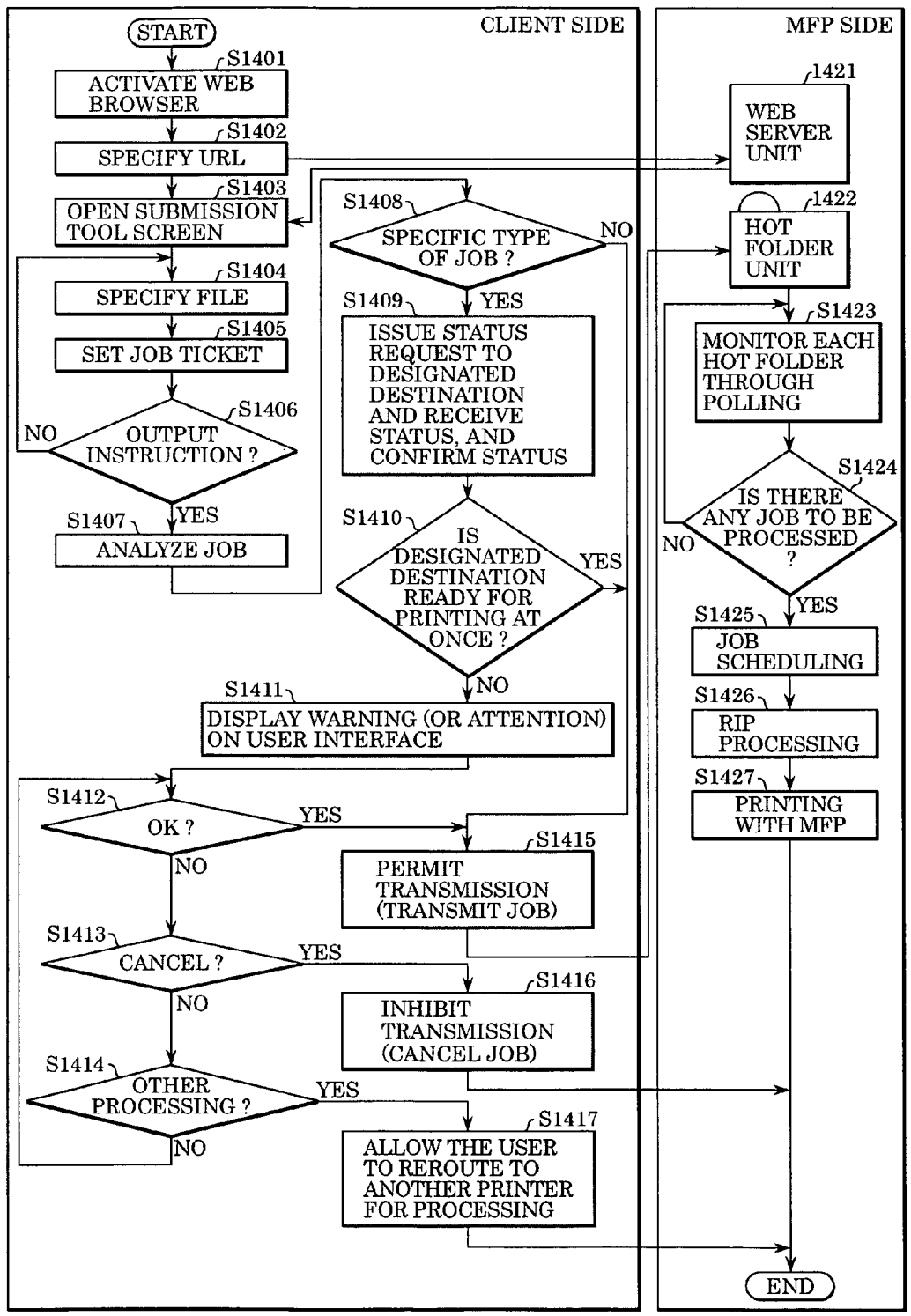
FIG. 9 is a flowchart illustrating an example of second control processing procedures according to the present invention.

Now, with the present embodiment, let us say that a Web server 1421 is included in the MFP 104 or MFP 105 illustrated in FIG. 1, as illustrated in FIG. 9.

This Web server 1421 is a Web server program, a representative example of which is IIS (Internet Information Server) of Microsoft Corporation®. Upon the user inputting a URL (Uniform Resource Locator) from the client computer via the Web browser using HTTP, the Web server 1421 provides a service screen (Web page) to the Web browser.

Description is made below regarding processing for inputting a job from the client computer 103 to the MFP 104 or MFP 105 using the Web submission tool with reference to the flowchart in FIG. 9.

FIG. 9 is a flowchart illustrating an example of second control processing procedures according to the present invention, and corresponds to processing for inputting a job from the client computer 103 to the MFP 104 or MFP 105 using the Web submission tool. Note that Step S1401 through Step S1417 denote steps on the client computer 103 side, and are realized by the CPU 401 illustrated in FIG. 4 loading a program stored in the HD 411 on the RAM 402, and executing the program. Step S1423 through Step S1427 denote steps on the MFP 104 or MFP 105 side, and are realized by the CPU within the core unit 206 illustrated in FIG. 2 loading a program stored in ROM or the like to RAM, and executing the program.

First, upon the user performing operations for activating the Web browser on the client computer 103 side, the CPU 401 activates the Web browser (Step S1401). Next, upon the user specifying (inputting) the URL of the Web server 1421 on the MFP 104 or MFP 105 side (also specifying the MFP with this operation), the Web browser run by the CPU 401 (hereinafter, simply referred to as Web browser) transmits an HTTP message to the MFP corresponding to the specified URL (Step S1402).

The Web server 1421, which received the HTTP message from the client computer 103, returns the Web submission tool to the client computer 103 as an HTTP response.

Subsequently, the Web browser of the client computer 103, which has received the Web submission tool returned from the Web server 1421 of the MFP, executes the Web submission tool on the Web browser (i.e., the Web submission tool is executed by the CPU 401), and opens the screen of the Web submission tool (displays the screen on the display region of the Web browser on the monitor 410) (Step S1403). An example of the screen of the Web submission tool is illustrated in FIG. 10.

FIG. 10 and FIGS. 11A through 11D are diagrams illustrating an example of the Web submission tool screen to be displayed on the Web browser of the client computer 103 illustrated in FIG. 1.

Figure 10:
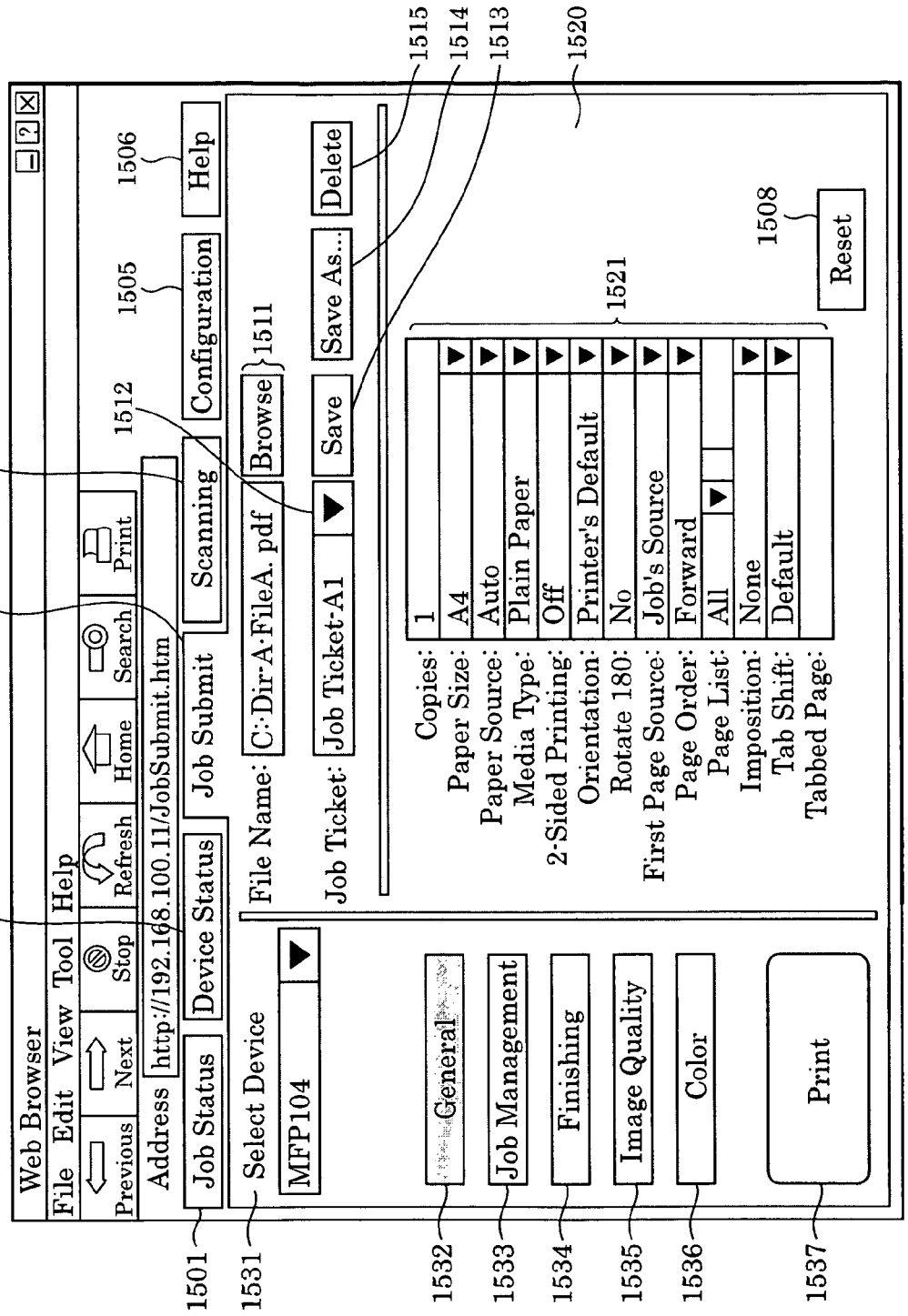
FIG. 10 is a diagram illustrating an example of a Web submission tool screen to be displayed on the Web browser of the client computers illustrated in FIG. 1.

As illustrated in FIG. 10, the user selects the input destination of a job using a select device key 1531, and specifies the job (file) to be input using a Browse key 1511. The file to be input may be a file on the client computer 103 or a file on the network 101.

The user selects a job ticket using a job ticket selection field 1512. The user can save a job ticket with a Save key 1513, save a job ticket using a different name using a Save As key 1514 or delete a job ticket using a Delete key 1515. The user can reuse a job ticket previously used by displaying this ticket with the job ticket selection field 1512.

A settings display is shown in a settings display area 1520. The information shown in the settings display area 1520 varies based on selection of a classification key 1532-1533 as described in further detail next.

Upon the user clicking (specifying) a General key 1532, the Web submission tool displays a general settings display 1521 in the settings display area 1520 as shown in FIG. 10, where the user can set general settings such as the number of copies, sheet size, and the like. Upon the user clicking (specifying) A Job Management key 1533, the Web submission tool displays job management settings display 1522 as illustrated in FIG. 11A in the settings display area 1520, where the user can set the priority order of a job and the like. Upon the user clicking (specifying) a Finishing key 1534, the Web submission tool displays a finishing settings display 1523 as illustrated in FIG. 11B in the settings display area 1520. Upon the user clicking (specifying) an Image Quality key 1535, the Web submission tool displays an image quality settings display 1524 as illustrated in FIG. 11C in the settings display area 1520. Upon the user clicking (specifying) a Color key 1536, the Web submission tool displays a color settings display 1525 as illustrated in FIG. 11D in the settings display area 1520.

Now, description will return to the flowchart in FIG. 9. The Web submission tool accepts specification of a file and setting of a job ticket until the user clicks (specifies) a Print key 1537 on the screen of the Web submission tool illustrated in FIG. 10 (steps S1404 through S1406). In the event that the Web submission tool determines that the user performs specification of a file (job) and setting of a job ticket, and clicks the Print key 1537, the Web submission tool performs analysis of the job in Step S1407.

For example, the Web submission tool analyzes the job security level of a job on the display 1522 illustrated in FIG. 11A. In the event that the job security level is set high, the Web submission tool handles the job as a specific job (handles the job as the first-type job data), otherwise, handles the job as a normal job (handles the job as the second-type job data). This determination regarding whether or not the job is a specific job may be made based on the attribute thereof, or the level of a job ticket or an operator.

Examples of the determination methods are described below. One example is a determination method wherein in the event that the data to be printed is color data, the CPU 401 determines that the data is data having a high level of importance (first-type job data), and in the event that the data to be printed is monochrome data, determines that the data is data having a lower level of importance than the previous data, i.e., the second-type job data.

Another example is a determination method wherein in the event that the data to be printed is photograph data, the CPU 401 determines that the data is data having a high level of importance (first-type job data), and in the event that the data to be printed is character data, determines that the data is data having a lower level of importance than the previous data, i.e., the second-type job data.

A further example is a determination method wherein in the event that the data to be printed is printout data including information of which information relating to proper noun such as a user name (person name), company name, or the like is identifiable, the CPU 401 determines that the data is data having a high level of importance (first-type job data), and in the event that the data to be printed is printout data excluding such information, determines that the data is data having a lower level of importance than the previous data, i.e., the second-type job data.

A further example is a determination method wherein in the event that the file format or application type of the data to be printed is predetermined-type job data (e.g., in the event of a PDF (Portable Document Format) file), the CPU 401 determines that the data is data having a high level of importance (first-type job data), and in the event that the file format or application type of the data to be printed is not predetermined-type job data (e.g., in the event of data created by document creation software or a file created by table calculation software), determines that the data is data having a lower level of importance than the previous data, i.e., the second-type job data, or the like.

As described above, a method for the CPU 401 determining whether the job data to be printed is the first-type job data or the second-type job data based on the type and content of the job data may be employed.

Alternatively, determination may be made with a method like that described next. An example is a determination method wherein in the event that the number of print copies is equal to or greater than a predetermined number of copies (100 copies, for example), the job data is determined as data having a high level of importance (first-type job data), but in the event that the number of print copies is less than a predetermined number of copies (less than 100 copies, for example), the job data is determined as data having a lower level of importance than the previous data (second-type job data).

Another example is a determination method wherein in the event that the printout data to which predetermined sheet process as to recording sheets, such as stapling, binding, punching, or the like is set, the printout data is determined as data having a high level of importance (first-type job data), but in the event that the job data to which such sheet process is not set (for example, a job not executing stapling, binding, and punching), the job data is determined as data having a lower level of importance than the previous data (second-type job data).

A further example is a determination method wherein in the event that the job data to which a printout condition such as inserting a cover or slip sheet into printed recording sheets is set, the job data is determined as data having a high level of importance (first-type job data), but in the event that the job data to which such a printout condition is not set, the job data is determined as data having a lower level of importance than the previous data (second-type job data), or the like.

As described above, a method for the CPU 401 determining whether the job data to be printed is the first-type job data or the second-type job data based on the printout condition set by the user may be employed. A method for the CPU 401 determining whether the job data to be printed is the first-type job data or the second-type job data by the user explicitly setting whether or not the job data is critical data (for example, by the user setting whether or not the job data is critical data using the critical document button 1117 of the UI in FIG. 5 provided by the printer driver, or by the user setting the security level of the job data via the setting item 1522 of the UI in FIG. 11 provided by the Web submission tool, or the like) may be employed.

Thus, various types of applications may be applied. Note that this is an issue common to all the embodiments described with regard to the present invention.

Now, description will return to the flowchart in FIG. 9. In Step S1408, the Web submission tool determines whether or not the job to be printed is a specific-type job (determines whether the job is the first-type job data or the second-type job data), and in the event of determining that the job is not a specific-type job (in the event of determining that the job is the second-type job data), the flow proceeds to Step S1415, where the Web submission tool allows the PC to transmit the job as a general print job (second-type job data) so as to transmit the job to a hot folder 1422 specified.

On the other hand, in the event that the Web submission tool determines that the job is a specific-type job (in the event of determining that the job is the first-type job data) (yes in Step S1408), the flow proceeds to Step S1409, where the Web submission tool issues a status request to the MFP serving as the printing device selected as a printing destination so as to request the current printer state. The MFP side requested determines whether or not the printer of the MFP is in an immediately-printable state (i.e., whether or not the temperature adjustment of the fixing device is adjusted, whether or not the printer is in a down state due to jam or an error, whether or not a great number of jobs are in a print-standby state, as well as whether or not the printer is in a standby state waiting for a job), and returns the status information thereof to the client computer 103 side. The Web submission tool on the client computer 103 side receives and confirms the status information.

Next, in Step S1410, the Web submission tool determines whether or not the specified destination printer is in an immediately-printable state based on the status confirmation processing in Step S1409. The criterion of this determination may be made wherein estimated time necessary for the specified destination MFP (MFP 104 or MFP 105) to start printout following the MFP confirming whether or not the MFP can start printout immediately by checking the warming-up state, jam detecting state, errors, lack of consumables (sheet, toner, or the like), and the amount of print jobs queued, is set beforehand, and only in the event that the estimated time is shorter than the set time, determination is made that the printer is in an immediately-printable state, for example.

In the event that the Web submission tool determines that the specified destination MFP is in an immediately-printable state (yes in Step S1410), the flow proceeds to Step S1415, where the Web submission tool allows the PC to transmit the job so as to transmit the job to the hot folder 1422 of the specified destination MFP.

Figure 12:
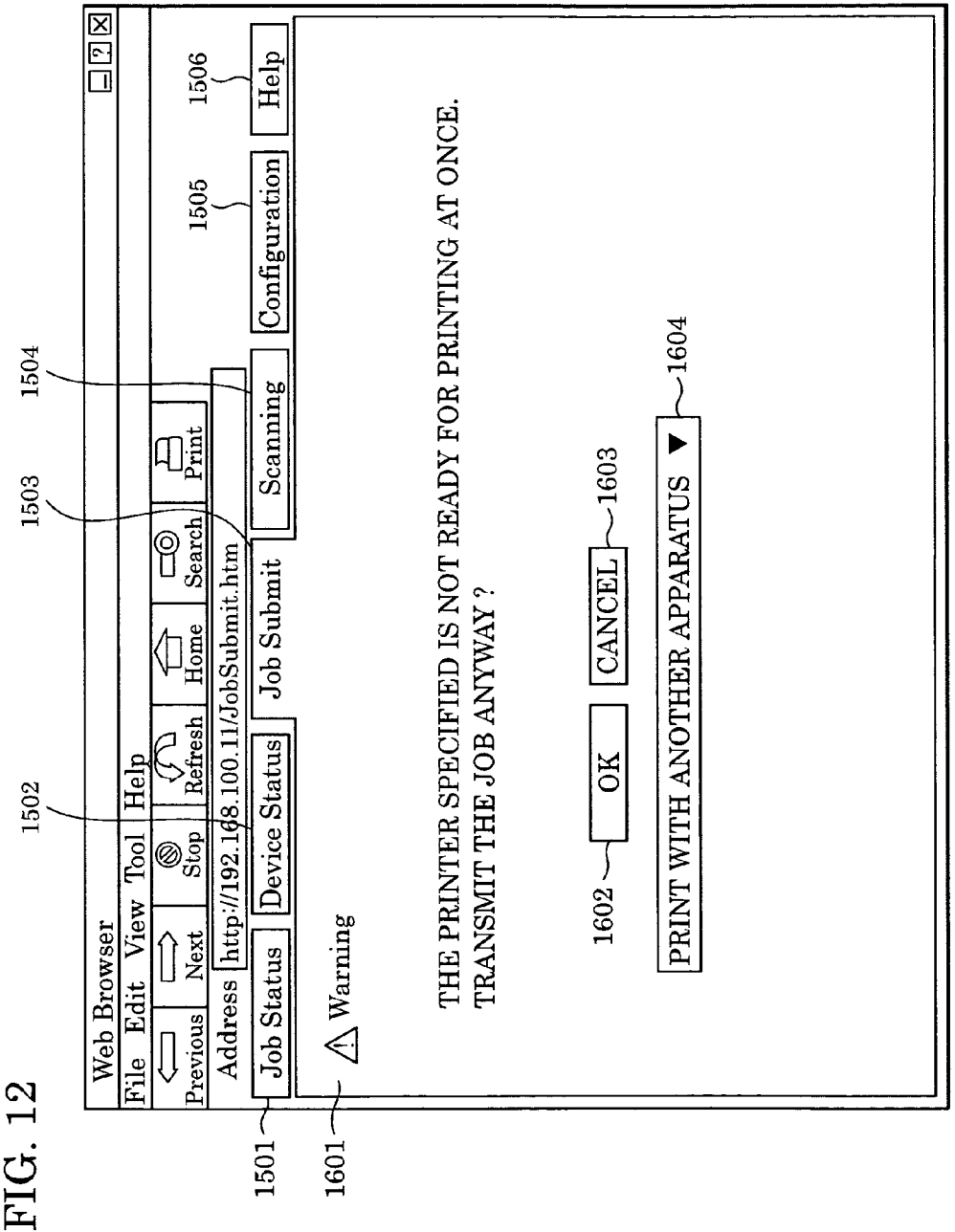
FIG. 12 is a diagram illustrating an example of a warning user interface to be displayed on the monitors of the client computers illustrated in FIG. 1.

On the other hand, in the event that the Web submission tool determines that the specified destination MFP is not in an immediately-printable state (no in Step S1410), the Web submission tool displays a UI 1601 such as the one shown in FIG. 12 on the screen of the Web submission tool (S1411) that warns or calls attention to the user, and asks the user to determine whether or not the job should be transmitted (permitted/inhibited).

FIG. 12 is a diagram illustrating an example of a warning UI to be displayed on the monitor 410 in the client computer 103 illustrated in FIG. 1.

Thus, even in the event that the PC controls the printing device to execute printout operation via the Web submission tool instead of the printer driver, the control unit (CPU 401) of the PC transmits, to the printer selected by the user of the PC via the Select Device key 1531 of the operating screen in FIG. 10, a status request command for requesting the status information of the printer under the condition that the user of the PC sets a high level of security to job data (first-type job data) via the job management setting item 1522 on the operating screen in FIG. 11A of the PC, and then inputs a printout start instruction via the Print key 1537 on the screen in FIG. 10. Then, the control unit of the PC obtains the status information from the printer as a reply result. In the event that the control unit of the PC determines that the printing device specified by the user of the PC is not in an immediately-printable state regarding this job (first-type job data) (also referred to as a case of determining that the printer is in a first state meaning that the printer is not in an immediately-printable state regarding the first-type job data) by checking the obtained status information, the control unit of the PC controls the display unit 410 to display an operating screen 1601 illustrated in FIG. 12. The operating screen 1601 includes: guide information for allowing the control unit of the PC to inform the user that the printer specified by the user is not in an immediately-printable state regarding this job (first-type job data); an OK key 1602 for allowing the user to input an instruction for permitting transmission of the job (first-type job data) from the PC so as to print the job (first-type job data) using the printing device following the user confirming the guidance display; a Cancel key 1603 for allowing the user to input an instruction for inhibiting transmission of the job from the PC so as not to print the job (first-type job data) using the printing device following the user confirming the guidance display; a Print-With-Another-Apparatus key 1604 for allowing the user to input an instruction for inhibiting the print job to be transmitted to the printing device selected by the user, but permitting transmission of the job using the other printing device (the other printing device present in this system other than the printing device selected by the user on the screen in FIG. 10), as display components. The user can permit/inhibit transmission of the first-type job data to be printed using the printing device specified by the user, or inhibit transmission of the first-type job data to be printed using the printing device specified by the user but permit transmission of the first-type job data to be printed using the other printing device capable of printout, through this operating screen 1601.

Note that the control unit (CPU 401) of the PC inhibits the display unit 410 of the PC from displaying the this screen 1601 in FIG. 12 in the event that the control unit of the PC transmits the aforementioned status request command to the printer selected by the user of the PC via the Select Device key 1531 on the operating screen in FIG. 10 under the condition that the user specifies the job to be printed as the critical document data (first-type job data) via the setting item 1522 in FIG. 11A of the PC, and then inputs a printout start instruction via the Print key 1537 on the screen in FIG. 10, the control unit of the PC checks the status information received from the printer as a reply result, and determines that the printing device specified by the user of the PC is in an immediately-printable state regarding this job (first-type job data) (also referred to as a case of determining that the printer is in a second state meaning that the printer is in an immediately-printable state regarding the first-type job data). Then, the control unit of the PC does not allow the user to select permission/inhibition of transmission of the job (first-type job data) via the OK button 1602 or the Cancel button 1603, and controls (allows) the job to be transmitted from the PC to print the job using the printing device (printing device selected by the user via the Select Device key 1531 in FIG. 10). In other words, if it is determined that the designated destination is ready for immediate printing (yes in Step S1410), the flow is controlled so as not to proceed to the processing in Step S1411, and to proceed to the processing in Step S1415.

Also, with the determination in Step S1408, in the event that the control unit (CPU 401) of the PC 103 determines that the job data to be printed is not a specific-type job (in the event that determination is made that the job data is the second-type job data), the flow is controlled so as not to proceed to the processing in Step S1409, but to proceed to step S1415. The processing itself for transmitting a status request to the printing device specified from the PC 103 is inhibited, the processing at the PC 103 for receiving the status information from the printing device, the processing at the PC 103 for confirming the status, and displaying the screen 1601 illustrated in FIG. 12 including information indicating that the specified printing device cannot print the job data immediately based on the status information on the display unit 410 are inhibited, upon the user inputting a printout start instruction by depressing the Print key 1537 on the operating screen in FIG. 10, the control unit of the PC allows this job (second-type job data) to be transmitted from the PC, and controls the printing device (printing device specified in FIG. 10) to perform printout processing in accordance with the printout conditions set via the operating setting items in FIG. 10 and FIGS. 11A through 11D regarding the job when the job can be printed on the printing device side. In other words, if it is determined that the job is not a specific type of job (no in Step S1408), the flow is controlled so as not to proceed to the processing in Step S1409, and proceed to the processing in Step S1415. Thus, in the event that the job data to be printed is the second-type job data, the control unit (CPU 401) of the PC 103 activates the status monitor function automatically, and inhibits operations such as obtaining the status of the specified printing device, and the like.

On the other hand, in the event that the job data to be printed is the first-type job data, the control unit (CPU 401) of the PC 103 activates the status monitor function automatically, and permits operations such as obtaining the status of the specified printing device, and the like. In other words, if it is determined that the job is a specific type of job (yes in Step S1408), the flow is controlled so as to proceed to the processing in Step S1409.

Note that an arrangement may be made wherein even if the job data to be printed is the second-type job data, in the event that a status monitor function independent from the aforementioned function by the control unit (CPU 401) of the PC for confirming the state of a printer is provided, the user inputs an instruction for activating the status monitor by manual operations via the operating unit of the PC, and the control unit (CPU 401) of the PC allows a series of procedures to confirm the state of the printer on the PC side. Thus configured, the advantage of providing a user-friendly arrangement corresponding to various requests from users can be improved further (this processing is not shown). With the UI 1601 warning the user, the user can select processing such as clicking (specifying) the OK key 1602 in the event that the user wants printout even if the printer cannot perform printout immediately, clicking (specifying) the Cancel key 1603 in the event of quitting transmission of the job, clicking (specifying) the Print-With-Another-Apparatus key 1604 in the event that the user wants other processing, or the like.

Description will now return to the flowchart in FIG. 9. In Step S1412, the Web submission tool determines whether or not the user has specified the OK key 1602, and in the event that determination is made that the user has specified the OK key 1602, the flow proceeds to Step S1415, where the Web submission tool allows this job to be transmitted so as to transmit the print job to the hot folder 1422 of the specified destination MFP.

On the other hand, in the event that the Web submission tool determines that the user has not specified the OK key 1602 in Step S1412, the Web submission tool determines whether or not the user has specified the Cancel key 1603 in Step S1413, and in the event that the Web submission tool determines that the user has specified the Cancel key 1603, the flow proceeds to Step S1416, where the Web submission tool inhibits transmission of the print job (job cancel), and ends the processing.

On the other hand, in the event that the Web submission tool determines that the user has not specified the Cancel key 1603 in Step S1413, the Web submission tool determines whether or not the user has specified the Print-With-Another-Apparatus key 1604 in Step S1414, and in the event that the Web submission tool determines that the user has specified the Print-With-Another-Apparatus key 1604, the flow proceeds to Step S1417, where the Web submission tool allows the user to specify another printer, performs processing to reroute to another MFP specified by the user, and ends the series of processing.

On the other hand, in the event that the Web submission tool determines that the user has not specified the Print-With-Another-Apparatus key 1604, the Web submission tool controls the flow to return to Step S1412.

Also, with the specified destination MFP (MFP 104 or MFP 105) side, the job transmitted is transmitted to the hot folder 1422, the CPU within the core unit 206 of the MFP constantly monitors each hot folder (Step S1423) and determines in Step S1424 whether or not there is a job within the hot folder 1422 using polling (Step S1423).

In the event that the CPU within the core unit 206 determines in Step S1424 that there is a job within the hot folder 1422, the CPU within the core unit 206 schedules the job (Step S1425), subjects the job to RIP processing (Step S1426), controls the MFP to print the job (Step S1427), and ends the processing.

As described above, in an environment in which a job is output from a computer to a printer using the job input tool through the Web browser, conventional wasteful labor can be eliminated wherein following a job being output to a printer, a user finds out that the printer is not ready, and cancels the job so as to output the job to another printer. Also, waiting time as with conventional arrangements in which the user worries about secrets leaking, private information leaking, and the like, until a job is processed, can be prevented in the event that the user has accidentally output a print job such as a secret document, private document, or the like to a printer which cannot print the job immediately.

Also, with this configuration, a case in which the user transmits a print job from a remote location can be assumed, in such a case, the present invention is extremely effective. That is to say, in the event that the user has accidentally output a print job such as a secret document, private document, or the like to a printer at a remote location which cannot print the job immediately, waiting time as with conventional arrangements in which the user remains worried about secrets leaking, private information leaking, and the like, until a job is processed, can be prevented. In other words, a print job including secret information, private information, or the like can be prevented from being exposed to risk of secrets leaking or private information leaking by the print job being stored in a printing device (MFP, printer, or the like) for a long period.

Third Embodiment

With the first and second embodiments, description has been made regarding an arrangement in which upon the user specifying the Print-With-Another-Apparatus key 1304 or 1604 as a measure to deal with the MFP (printer) which is not in an immediately-printable state, processing for rerouting to the specified another MFP (printer) is performed. However, an arrangement may be made in which processing other than rerouting to another MFP can be selectable. Description is made below regarding an example of the embodiment thereof.

Figure 13:
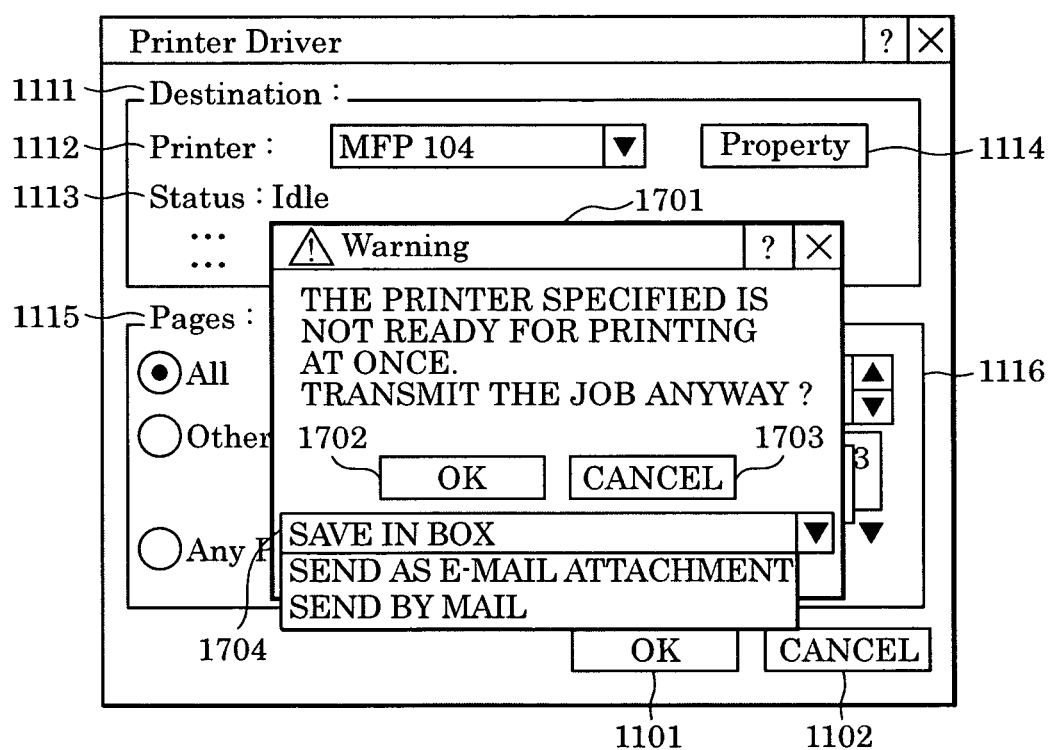
FIG. 13 is a diagram illustrating an example of a warning user interface to be displayed on the monitors of the client computers illustrated in FIG. 1.

For example, as illustrated in FIG. 13, an arrangement may be made in which the user can select a method for temporarily storing a job in the aforementioned box, extracting the job from the box so as to print the job following the printer entering an immediately-printable state, a method for distributing the data using a transmission protocol, such as E-mail or the like, and printing the data at the distributing destination, or a method for requesting the third party of the job, and requesting him/her to send back the output thereof by mail or the like.

FIG. 13 is a diagram illustrating an example of a warning UI 1701 to be displayed on the monitor 410 in the client computer 103 illustrated in FIG. 1.

In FIG. 13, the user clicks an OK key 1702 in the event that the user wants printout even if the printer cannot perform printout immediately, clicks a Cancel key 1703 in the event of quitting transmission of the job, and further selects a desired processing using a selection field 1704 in the event that the user wants other processing.

For example, upon the user selecting "SAVE IN BOX" in the selection field 1704, the CPU 401 transmits the job to the aforementioned MFP box (box region provided within the memory unit 210 illustrated in FIG. 2 for each user, which is protected by a password) so as to temporarily store the job in the box. Following the printer entering an immediately-printable state, the user instructs the MFP to print the job, and the MFP extracts the job from the box so as to print the job.

Upon the user selecting "SEND AS E-MAIL ATTACHMENT" in the selection field 1704, the CPU 401 prompts the user to specify the E-mail address of the distributing destination, and distributes the job (data file such as PDF or the like and printer setting item data) to the mail address specified by the user using E-mail transmission so as to print the job at the distributing destination.

Upon the user selecting "SEND BY MAIL" at the selection field 1704, the CPU 401 stores the job (data file such as PDF or the like and printer setting item data) on a predetermined recording medium. Subsequently, the user requests the third party of the job, and also requests him/her to send the output medium thereof by postal mail or the like.

Note that FIG. 13 illustrates the warning UI corresponding to a case of employing the printer driver, but this can also be applied to a case of employing the Web submission tool.

As described above, even in the event that the specified destination printer cannot print job immediately, the user can quickly perform processing with another method. In the event that the user has accidentally output a print job such as a secret document, private document, or the like to a printer at a remote location which cannot print the job immediately, waiting time as with conventional arrangements in which the user worries about secrets leaking, private information leaking, and the like, until a job is processed, can be prevented.

Note that with the first through third embodiments, a case in which a print job is input to a printer from a client computer serving as an example of an information processing device has been described, but the present invention can be applied to even in a case in which a print job input from a scanner device equipped with any one of the scanner 106, MFP 104 and MFP 105 serving as another example of an information processing device is executed at any one of the multiple printing devices (MFPs 104 and 105, and SFP 107) equipped with the present system. In this case, an arrangement is made so as to execute the same actions as those described in each embodiment by controlling the control unit of the scanner device serving as a data generating source of the print job to execute the same control as with the control unit of the PC 103, and also controlling the operating unit (operating unit including a touch-panel-type display device) equipped with the scanner device to the aforementioned various types of user interface screens. This configuration realizes the present embodiment, and various types of advantages according to the present embodiment can be yielded, with any information processing device capable of generating a print job data that can be printed at a printing device, including the computer and scanner device in the present system.

As described with the first through third embodiments, the present embodiment employs a job processing method in a job processing system having an information processing device including at least any one of a host computer and scanner device capable of transmitting job data that can be printed at an printing device, wherein if job data to be transmitted from the information processing device is the first-type job data, in the event that a printing device specified as a printing destination of the job data cannot print the job data immediately (for example, in the event of Yes in Step S1205 in FIG. 7→No in Step S1207, or in the event of Yes in Step S1408 in FIG. 9→No in Step S1410, or the like), transmission processing of the job data at the information processing device can be inhibited (for example, the processing in Step S1213 in FIG. 7, or the processing in Step S1416 in FIG. 9), on the other hand, with a case in which job data to be transmitted from the information processing device is the first-type job data, in the event that a printing device specified as a printing destination of the job data can print the job data immediately (for example, in the event of Yes in Step S1205 in FIG. 7→Yes in Step S1207, or in the event of Yes in Step S1408 in FIG. 9→Yes in Step S1410, or the like), transmission processing of the job data at the information processing device can be permitted (for example, the processing in Step S1212 in FIG. 7, or the processing in Step S1415 in FIG. 9).

Thus, the present invention can prevent various types of problems described as the conventional art or problems to be solved in a reliable manner, and also provide advantages for corresponding to various types of requests described as problems to be solved, and the like.

For example, the present embodiment can handle a demand in which in the event that a situation occurs in which a printer cannot print a job transmitted from the PC immediately, and if the PC has known the situation, the PC needs to inform the user of the situation before the user transmits the job from the PC. Also, for example, the present invention can handle a demand that printout itself should be prevented before the user transmits the job from the PC in the event that the printer cannot print the job immediately as a matter of course, and further, depending on the content or type of data, in a situation as described above, storing the job in external memory (memory of a device other than the user's own information processing device, such as the memory of the printing device, the memory of the server device, or the like) itself and transmitting the job to the printer which cannot print the job immediately itself, should be prevented before the user transmits the job from the PC, if possible. Also, for example, the present invention can handle a demand that in the event that the type of data is data including private information such as a personal identification document, documents relating to insurance, and the like, or data having a high level of secrecy and importance such as data of conference documents and specifications, the user would want to hide such information from outsiders, and accordingly, in the event of such data, there is the need to prevent the aforementioned situations from occurring as much as possible from the perspective of leak of information.

Also, the present embodiment can handle and prevent conventional problems, such as the conventional problem that even if a device (printing device or server, in this example) has high-security functions making information leaks impossible, storing data in external memory may make the user feel that the data is insecure and that information may leak.

As described above, the present embodiment can provide a user-friendly and user-advantageous arrangement corresponding to various user demands and needs under various environments.

Also, as another advantage, the present embodiment can prevent problems that cannot be handled by a conventional printer driver or the like having a function for confirming the state of a printer prior to transmitting a job to the printer from the PC from occurring, in addition to solving such a problem, can provide an arrangement for sufficiently handling the aforementioned various types of demands.

Also, assuming the above-described configuration, in the event that job data to be transmitted from the information processing device is the second-type job data, the present embodiment allows the information processing device to transmit the job data, regardless of whether or not a printing device specified as the printing destination of the job data can perform the printout processing of the job data (for example, see control where if No in Step S1205 in FIG. 7, the flow is controlled to proceed to Step S1213. Also, see control where if No in Step S1408 in FIG. 9, the flow is controlled to proceed to the processing in Step S1415).

Thus, the present embodiment can provide the aforementioned advantages, and also provide advantages such that work like asking the user determination regarding data having a not-so-high-level of importance can be eliminated, problems such as reduced ease-of-use for solving the aforementioned problems can be prevented, the aforementioned advantages can be provided while maintaining high operability, needless data exchange between an information processing device and a printing device (e.g., a series of procedures for confirming the status of the printer are performed in spite of unnecessary procedures) can be prevented, and the like.

For example, the present embodiment can prevent conventionally anticipated problems such as operability by the user deteriorating due to uniformly performing the same processing and control regardless of the content and type of the job to be processed in order to solve the problems on which the present application focuses attention, and also correspond to the aforementioned various types of demands, resulting in new problems, from occurring, and can realize the aforementioned advantages without causing such new problems.

In addition, with a case in which job data to be transmitted from the information processing device is the first-type job data, even in the event that a printing device specified as the printing destination of the job data cannot perform the printout processing of the job data immediately, the user of the information processing device is informed that the printout processing of the job data cannot be performed immediately without forcibly inhibiting the information processing device from transmission of the job data, and then in the event that the user inputs an instruction for inhibiting transmission of the job data via the information processing device, transmission of the job data by the information processing device is inhibited, but on the other hand, following the user being informed that the printout processing of the job data cannot be performed immediately, in the event that the user inputs an instruction for permitting transmission of the job data via the information processing device, even if the job data is the first-type job data, the information processing device is controlled to permit transmission of the job data (for example, see display control wherein the screen 1301 in FIG. 8 or the screen 1601 in FIG. 12 is displayed on the display unit 410, and then the user is prompted to determine the final decision).

Thus, the present embodiment can provide the aforementioned advantages, and also further improve advantages such that the user can have a choice, the various needs from users can be handled, a user-friendly and convenient system can be provided, and the like while preventing problems such as the device operating on its own decision without asking the user, and the like.

Also, the present embodiment inhibits the information processing device from transmission of the job data not only in a case in which the printing device cannot execute printing processing of the job data immediately due to at least any one of various factors including: an error relating to consumables including at least either a lack-of-toner state or lack-of paper state in the printing device; an error such as paper jam in the printing device; and a power-off state of the printing device, but also in a case in which the printing device cannot execute printing processing of the job data immediately since the printing device is in a waiting state for printing including at least any one of states: a temperature-adjusting state and image-quality adjusting state of the printing device, and a printing state in which the printing device is printing another job data, even if such errors do not occur.

Thus, the present invention can prevent various types of problems described as the conventional art or problems to be solved in a reliable manner, and also achieve advantages described as problems to be solved in a reliable manner, thereby enabling wide application of the invention.

Also, with the present embodiment, the following processing regarding whether the job data to be transmitted from the information processing device is the first-type job data or the second-type job data being performed, processing regarding whether a printing device specified as the printing destination of the job data can perform printout of the job data immediately can be performed (for example, determination in Step S1205 in FIG. 7 is made, and then determination in Step S1207 is made. Similarly, determination in Step S1408 in FIG. 9 is made, and then determination in Step S1410 is made).

More specifically, in the event that job data to be transmitted from the information processing device is the first-type job data, the status monitor function for confirming the status of a printing device specified as the printing destination of the job data is automatically activated (for example, see control flow in a case of Yes in Step S1205 in FIG. 7, the flow proceeds to the processing in Step S1206, where the status monitor function is automatically activated) so that the information processing device can confirm information regarding whether or not the printing device specified as the printing destination of the job data can perform printout of the job data. On the other hand, in the event that job data to be transmitted from the information processing device is the second-type job data, automatic activation of the status monitor function is inhibited (for example, see control in a case of No in Step S1205 in FIG. 7, the flow is controlled so as not to proceed to Step S1206, the processing for automatically activating the status monitor function is inhibited, and the flow proceeds to the processing in Step S1212).

Thus, the present embodiment can provide the aforementioned advantages, and also prevent problems such as needless exchange of data between an information processing device and a printing device.

Also, even in the event that job data to be transmitted from the information processing device is the second-type job data, the present embodiment responds to user operations of the information processing device, and allows the status monitor function to be activated.

For example, though not illustrated in the drawings, in the event that the user inputs an activating instruction for activating the status monitor via the mouse so that the user can confirm the status of a printer on the monitor 410 of the PC 103, the PC 103 transmits a command for acquiring status information to the printer side, receives the status information as a reply result, controls the display unit 410 to display the status information, prompts the user of the PC 103 to confirm the status information of the printer, following which prompts the user to set the printout settings of the second-type job data, or the like via the printer driver in FIG. 5 and FIG. 6, following which allows the printer of which the status is confirmed by the user to perform a series of control for printout operation.

Thus, the present embodiment can provide the same advantages as the aforementioned advantages, and also further improve advantages such that the various needs from users can be handled, a user-friendly and convenient system can be provided, and the like.

With a case in which job data to be transmitted from the information processing device is the first-type job data, in the event that a printing device specified as the printing destination of the job data cannot perform the printout processing of the job data immediately, the present embodiment allows the user to select at least any one of the choices regarding: whether to allow the information processing device to transmit the job data; whether to inhibit the information processing device from transmission of the job data; and whether to perform printout of the job data with another printing device, through the information processing device (see a display control example relating the UI in FIG. 8, and a display control example relating to the UI in FIG. 12).

Thus, the present embodiment can provide the same advantages as the aforementioned advantages, and also provide a user-friendly and convenient system capable of handling the various needs of users.

Also, according to the present embodiment, print job data having a higher level of importance than the second-type job data can be processed as the first-type job data as described above, and accordingly, the present invention can prevent various types of problems in the conventional art or problems to be solved in a reliable manner, and also achieve advantages described as problems to be solved in a reliable manner.

Also, according to the present embodiment, job data to which predetermined processing conditions are set via the user interface such as the printer driver, Web submission tool, or the like of the information processing device can be processed as the first-type job data, job data to which predetermined processing conditions are not set can be handled as the second-type job data, and accordingly, the aforementioned advantages can be provided, and also advantages such as an arrangement (device, system, service, or the like) corresponding to the needs of various users.

Also, with the present embodiment, in the event of permitting the information processing device to transmit the job data, the job data transmitted from the information processing device is stored in an external storage device different from the information processing device, which includes at least either memory such as a hard disk equipped with the printing device itself or memory of the server device or the like, the printing device reads out the job data from the storage device so as to perform printout of the job data, and also employing such memory enables multiple jobs to be processed simultaneously in parallel.

For example, even while reading out a certain job from the hard disk (the hard disk within the printing device or the hard disk within the server device) and sequentially printing the job, subsequent other jobs can be sequentially accepted, while sequentially storing the print data of the subsequent jobs in the hard disk, processing, such as creating a print-standby queue can be performed, i.e., printing operation of the preceding job and storing operation of the subsequent job, can be performed simultaneously in parallel. Thus, advantages such as maintaining high productivity of the entire system can be provided. On condition of such a configuration, in the event of inhibiting the information processing device from transmission of the job data, storing the job data in the storage device itself is inhibited. Thus, the present invention has advantages such that can prevent various types of problems described in the conventional art or problems to be solved in a reliable manner, and also achieve advantages described as problems to be solved in a reliable manner can be obtained even with such a high productivity system.

Also, though not described in particular, with the present embodiment, the first-type job data and the second-type job data can be stored in the memory of the printing device or the server device, and multiple jobs stored in the memory with the aforementioned embodiments can be printed sequentially in certain print order (for example, in the order stored in memory, or in data-accepted order), and also in the event that job data of which printout using the printing device is completed is the first-type job data, the first-type job data that completes printout within the storage device is controlled so as to be eliminated. The second-type job data may be eliminated after printout. Thus, security after printout can be also secured as a matter of course, the aforementioned advantages can be provided, and also advantages such as an arrangement (device, system, service, or the like) corresponding to the needs of various users.

Note that the present embodiment is configured so as to handle the following types of forms other than the aforementioned configuration. Description is made below regarding an example thereof.

Fourth Embodiment

With the first through third embodiments, description has been made regarding an arrangement in which a job processing system capable of outputting a print job that can be processed by a printing device (MFPs 104 and 105, and printer 107) from an information processing device (client computer 103) to the printing device which can communicate via a certain communication medium (network 101), in response to a printout instruction, confirms the status of the specified destination printing device, and performs permission/inhibition control of transmission of a print job based on the status of the printing device. However, an arrangement can be made in which an information processing device capable of outputting a job that can be processed by various types of devices to the device that can be communicated via a certain communication medium, in response to a job printout instruction, confirms the status of the specified destination device, and performs permission/inhibition control of transmission of a job based on the status of the device. For example, an arrangement can be made in which permission/inhibition control of transmission of a scan job is performed based on the status of the device at the time of remote scanning using a scanner driver. Description is made below regarding the embodiment thereof.

Figure 14:
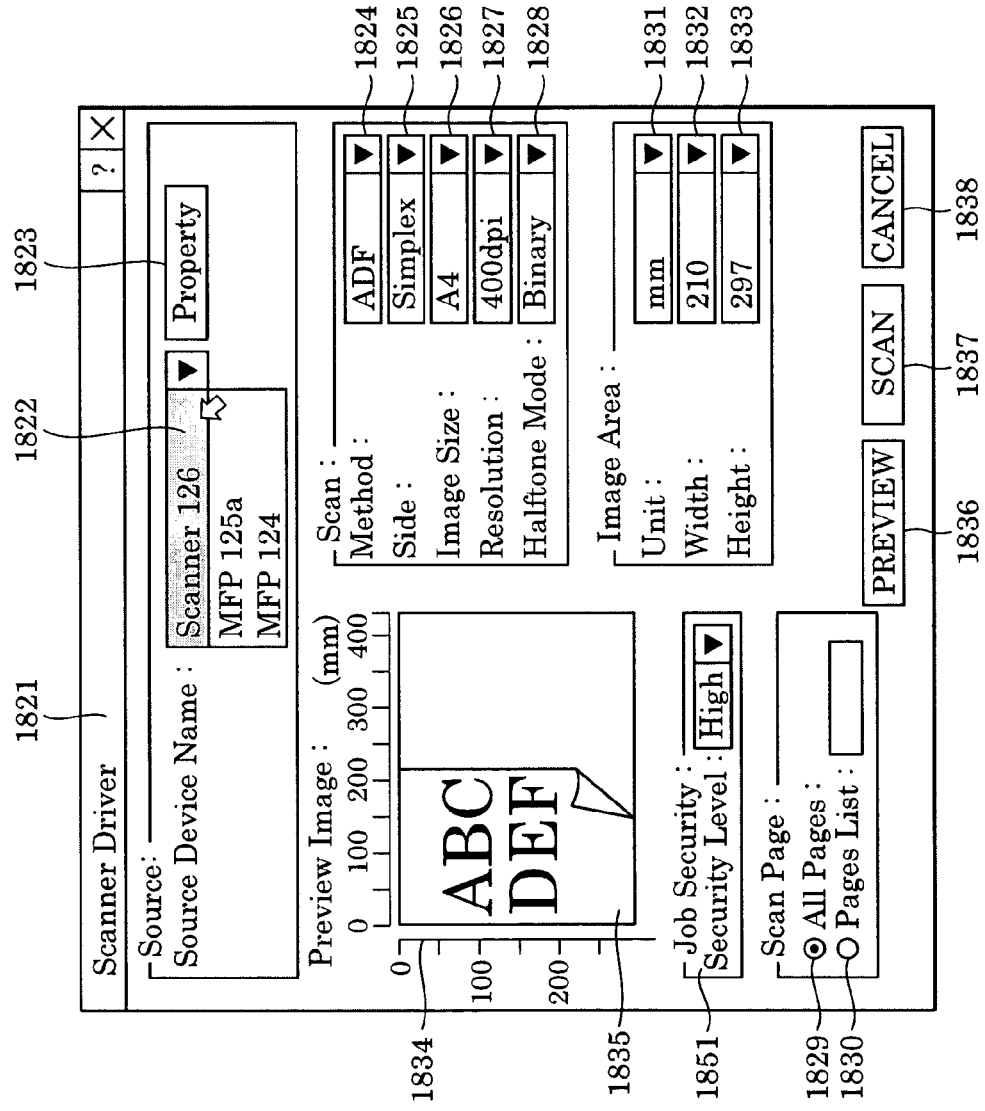
FIG. 14 is a diagram illustrating an example of a GUI (graphical user interface) of a scanner driver to be displayed on the monitors of the client computers illustrated in FIG. 1.

FIG. 14 is a schematic diagram illustrating an example of a graphical user interface (GUI) of a scanner driver to be displayed on the monitor 410 in the client computer 103 illustrated in FIG. 1, and is a GUI to be displayed in the event that the user performs a display instruction regarding property relating to reading of images on a scan setting GUI to be displayed when the user performs a scan instruction from an application or the like. The user can scan the desired image as to an image disposed on the document table by specifying the desired setting parameters using this GUI.

The example GUI shown in FIG. 14 includes an input destination setting item 1822 serving as a target, a Property key 1823 for performing detailed setting, a preview display portion 1835 where the user can view a preview image, a setting portion of a job security level 1851, a scan pages area where a user can select to scan all pages 1829 or to scan selected pages 1830, a setting portion of a scan method which includes various settings 1824-1828, and a setting portion of an image region including various settings 1831-1833.

Upon the user completing the desired settings, the user starts preview using a Preview key 1836. In the event that there is no problem regarding a preview image, the user performs the scan operation using a Scan key 1837. In the event that the user wants to quit scan, the user can quit the scan using a Cancel key 1838.

Scan Sequence of Present Embodiment

Figure 15:
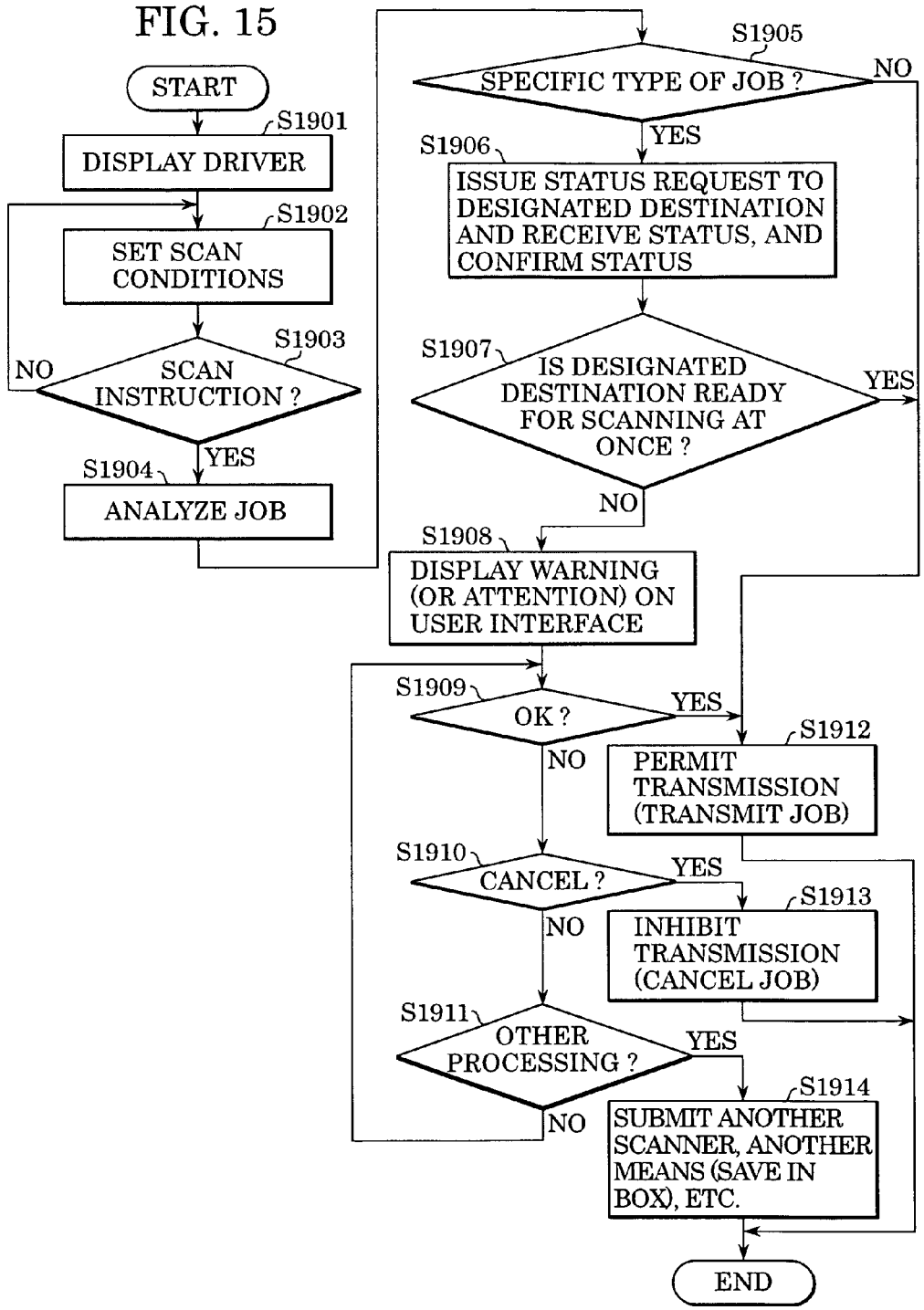
FIG. 15 is a flowchart illustrating an example of third control processing procedures according to the present invention.

Description is made below regarding the scan sequence of the present embodiment with reference to the flowchart in FIG. 15. FIG. 15 is a flowchart illustrating an example of third control processing procedures according to the present invention, and corresponds to a scan sequence according to the present invention. Note that the processing of this flowchart is realized by the CPU 401 illustrated in FIG. 4 loading a program stored in the HD 411 on the RAM 402, and executing the program.

Upon the user inputting a scanning instruction using an application or the like to the client computer 103, in Step S1901, the CPU 401 controls the monitor 410 to display the scanner driver GUI thereupon illustrated in FIG. 14. Then, the CPU 401 activates the scanner driver corresponding to the scanner selected in a scanner selection field 1821 (specified destination scanner).

Next, the scanner driver accepts the scan condition settings regarding a scanner and job as to the aforementioned scan setting items from the user until the user inputs a scan instruction (selection of the Scan key 1837 in FIG. 14) (Step S1902). In Step S1903, in the event that the scanner driver determines that the scan instruction is input, the scanner driver performs job analysis in Step S1904.

At this time, the scanner driver determines whether or not the job is a specific-type job by checking, for example, whether or not the security level 1851 is set to "High" or the like (Step S1905). At this time, in the event that the scanner driver determines that the job is not a specific-type job, the flow proceeds to Step S1912, where the scanner driver permits transmission of the job as a general scan job, controls the scan job to transmit to the specified destination scanner, and then ends the processing.

On the other hand, in the event that the scanner driver determines that the job is a specific-type job in Step S1905, the scanner driver issues a status request to the corresponding scanner side so as to request the current scanner state in Step S1906. The scanner side requested determines whether or not the scanner itself is in an immediately-scannable state (i.e., whether or not the scanner is in a down state due to feeder jam or an error, whether or not a great number of jobs are in a scan-standby state, as well as whether or not the scanner is in a state for waiting a job), and returns the status information thereof to the scanner driver side. The scanner driver receives and confirms the status information. An arrangement may be made in which the status information of the management table of each device stored within the client computer 103 is updated at this time.

Next, in Step S1907, the scanner driver determines whether or not the specified destination scanner is in an immediately-scannable state based on the status confirmation processing in Step S1906. In the event that the scanner driver determines that the scanner is in an immediately-scannable state, the flow proceeds to Step S1912, where the scanner driver permits transmission of the job, controls the scan job to be transmitted to the specified destination scanner, and ends the processing.

Figure 16:
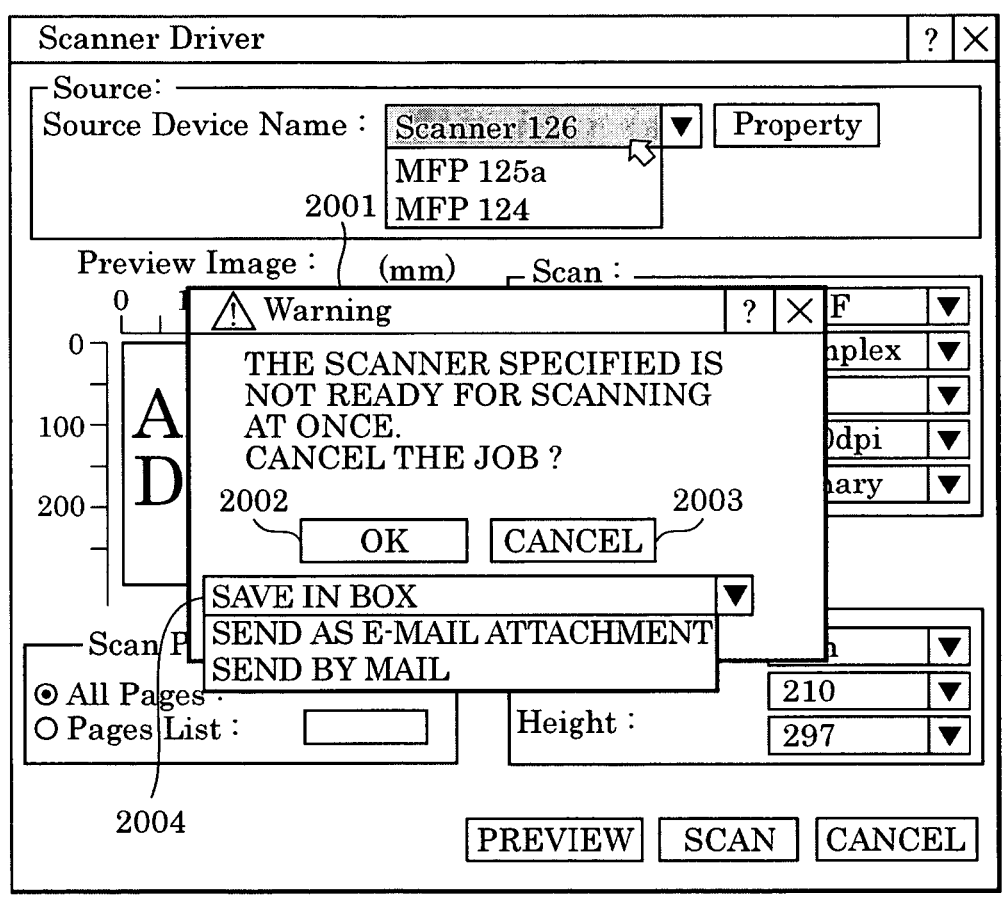
FIG. 16 is a diagram illustrating an example of a warning user interface to be displayed on the monitors of the client computers illustrated in FIG. 1.

On the other hand, in the event that the scanner driver determines that the specified destination scanner is not in an immediately-scannable state in Step S1907, processing proceeds to Step S1908 and the scanner driver displays a UI 2001 that warns or calls attention to the user as illustrated in FIG. 16, and asks the user to determine whether or not the job should be transmitted (permitted/inhibited).

FIG. 16 is a diagram illustrating an example of a warning UI to be displayed on the monitor 410 in the client computer 103 illustrated in FIG. 1.

With the UI 2001 warning the user, in the event that the user wants to perform a scan operation using the specified destination scanner even if the scanner cannot scan the job immediately, the user clicks (specifies) an OK key 2002. In the event that the user wants to quit transmission of the job, the user clicks (specifies) a Cancel key 2003. In the event that the user wants to perform other processing (processing such as scanning with another device, save in a box, send as E-mail attachment, or the like), the user can select other processing, for example, by selecting the desired processing listed in an other processing list 2004.

Description will return to the flowchart in FIG. 15. In Step S1909, the scanner driver determines whether or not the user has specified the OK key 2002, and in the event that determination is made that the user has specified the OK key 2002, the flow proceeds to Step S1912, where the scanner driver allows this job to be transmitted, transmits the scan job to the specified destination scanner, and then ends the processing.

On the other hand, in the event that the scanner driver determines that the user has not specified the OK key 2002 in Step S1909, the scanner driver determines whether or not the user has specified the Cancel key 2003 in Step S1910, and in the event that the scanner driver determines that the user has specified the Cancel key 2003, the flow proceeds to Step S1913, where the scanner driver inhibits transmission of the scan job (job cancel), and ends the processing.

On the other hand, in the event that the scanner driver determines that the user has not specified the Cancel key 2003 in Step S1910, the scanner driver determines whether or not the user has selected another process 2004 for performing other processing in Step S1911. In the event that the scanner driver determines that the user has specified another process 2004 for performing other processing, the flow proceeds to Step S1914, where the scanner driver performs the other processing (processing for rerouting a job to another scanner selected by prompting the user to select another scanner for scanning the job, processing for saving a job in a box, processing for distributing a job to a mail address specified by prompting the user to specify an E-mail address using E-mail distributing means, or the like) specified by the user, and ends the processing.

On the other hand, in the event that the scanner driver determines that the user has not specified another process 2004 for performing other processing, the scanner driver controls the flow to return to Step S1909.

Heretofore, with an environment in which a user outputs a scan job to a scanner from a computer, in the event that the user has output the scan job to the scanner from the computer, but the scanner could not have performed the scan job immediately, a document has remained in the scanner. In such a state, there has been a risk that the document is externally exposed until the scanner processes the scan job. However, with the present embodiment, the scanner, which cannot process the job immediately, is controlled so as not to transmit the job, so such a situation can be prevented from occurring, i.e., a situation in which the document is externally exposed until the scanner processes the job, resulting in secrets leaking.

Other Embodiments

With the first through fourth embodiments, description has been made regarding an arrangement in which the client computer 103 determines whether or not a device such as the MFP 104, MFP 105, printer 107, scanner 106, or the like can process a job immediately, and performs permission/inhibition control of output of the job to the device. However, an arrangement may be made such that in the event of a system in which the server computer 102 receives a job from the client computer 103, and transmits the job to each device, the server computer 102 determines whether or not a device can process the job immediately, and performs permission/inhibition control of output of the job to the device (or permission/inhibition control of acceptance of the job from the client computer).

Also, an arrangement can be made such that in response to a request to send a job from the client computer 103, a device itself such as the MFP 104, MFP 105, printer 107, scanner 106, or the like determines whether or not the device can process the job immediately prior to receiving the job, and performs permission/inhibition control of reception of the job.

Also, an arrangement can be made such that when a user sends an E-mail or the like from a E-mail-transmittable device such as a personal computer, cellular terminal, cellular phone, MFP, or the like, in the event that the user sends an E-mail to the address of the E-mail, i.e., to a mail server, the user inquires and determines whether or not an E-mail-acceptable device (such as a personal computer, cellular terminal, cellular phone, MFP, or the like) can receive the E-mail immediately (determination processing), and controls the E-mail so as not to send to a destination that cannot receive the E-mail immediately (control processing).

Note that the mail server receiving the inquiry is configured so as to transmit predetermined confirmation data to the destination of the E-mail, determine that there is a high possibility that the E-mail to be transmitted to the destination cannot be received immediately in the event that a response as to the confirmation data cannot be received within a predetermined period, and provide feedback of the determination results to the device serving as a transmission source.

Note that the aforementioned determination processing and control processing are assumed to be performed only in a case of a specific E-mail (for example, an E-mail for a specific address, E-mail to which a high level mode of importance is set, or the like).

Thus, an E-mail including secret information, private information, or the like can be prevented from being stored on the mail server for a long period without being received by the destination device, and from the risk of leaking of secret information and private information.

As described above, with an environment in which a user outputs a job (scan job) from a computer to a device (scanner, for example), conventional wasteful labor can be eliminated wherein following the user outputting a job to the device, the user finds out that the device cannot process the job immediately, and cancels the job and outputs the job to another device, and also waiting time as with conventional arrangements wherein the user worries about secrets leaking, private information leaking, and the like, until a job is processed, can be prevented, in the event that the user has accidentally output a job relating to processing such as a secret document, private document, or the like to a device which cannot immediately process the job. In other words, a job including secret information, private information, or the like can be prevented from exposure to the risk of secrets leaking or private information leaking by the job being stored in a device for a long period.

As described above, the configuration according to the present invention allows not only a job processing system including a device capable of generating print data including at least either a host computer or a document reading device (also referred to as a first information processing device or first device serving as a first applicable example) and a device having a printer function (also referred to as a second information processing device or second device serving as a first applicable example) to execute the aforementioned various-types of job control, as described in the aforementioned embodiments, but also a job processing system including a device having an E-mail function including at least either a host computer or a cellular phone (also referred to as a first information processing device or first device serving as a second applicable example) and a device having an E-mail function including at least either a printing device having an E-mail function or a cellular phone having an E-mail function (also referred to as a second information processing device or second device serving as a second applicable example) to execute the aforementioned various-types of job control.

Subsequently, following an arrangement being made so as to apply to wide and varied environments, for example, with a job processing system including a first information processing device capable of transmission of job data that can be processed by a second information processing device, a job processing method is employed wherein with a case in which job data to be transmitted from the first information processing device is the first-type job data, in the event that the second information processing device cannot perform processing of the job data immediately, the first information processing device can be inhibited from transmission of the job data, with a case in which job data to be transmitted from the first information processing device is the first-type job data, in the event that the second information processing device can perform processing of the job data immediately, the first information processing device is permitted transmission of the job data, and with a case in which job data to be transmitted from the first information processing device is the second-type job data, regardless of whether or not the second information processing device can perform processing of the job data immediately, the first information processing device is permitted transmission of the job data.

Thus, the present embodiment can provide the same advantages as the aforementioned advantages even with various environments.

Note that all configurations obtained by any and all combinations of the aforementioned embodiments are encompassed in the present invention. Also, with the present embodiment, description has been made principally regarding examples in a case in which the CPU 401 in the PC 103 or the like performs the above-described various types of control, but for example, an arrangement may be made wherein the server device, printing device, or a controller other than the aforementioned devices can perform the above-described various types of control, or an arrangement may be made wherein multiple controllers of multiple devices can confirm the aforementioned various types of control in collaboration with each other. Thus, any device configuration and any system configuration may be employed as long as the aforementioned control can be effected.

As described above, description has been made regarding each embodiment, but the present invention may be applied to an embodiment as a system, device, method, program, recording medium, or the like, and more specifically, may be applied to a system comprising multiple devices, and also may be applied to a device making up of a single device.

As described above, heretofore, status display of a driver has been in a passive manner, and status confirmation has been performed using polling. However, with the present invention, status of a printer is confirmed in an active manner from a printer driver side immediately following a printout instruction by a user, a warming-up state, errors, consumables, the amount of print jobs, and the like are checked so as to display the state thereof, and the user specifies a printout instruction following checking the state.

Also, with the present invention, only a predetermined type of job (specific job) is subjected to confirmation processing. In other words, a user can input whether or not the user performs confirmation processing from a driver screen, or confirmation processing can be performed according to the type or priority of a job.

Further, the present invention can handle job processing in a case of outputting a job using the Web submission tool (job input tool) or input to a hot folder as well as a printer driver.

Also, a job can be rerouted to another printer, saved in a box, or appended with an E-mail at the time of status confirmation, thus using time efficiently.

Further, the present invention can handle not only print job processing at a printing device such as a printer, MFP, or the like, but also job processing at other devices such as scan job processing at a scanner, facsimile transmission job processing at a facsimile device, or the like.

With the configuration as described in the present embodiment, the problems assumed in the conventional art can be solved. Also, with the configuration as described in the present embodiment, for example, the problems assumed in the conventional art can be prevented, and a user-friendly and user-advantageous arrangement corresponding to the requests and needs from various users under various environments can be provided.

With the configuration as described in the present embodiment, for example, in a situation in which a user has accidentally or inadvertently transmitted critical data to a device which cannot process job data immediately, the feeling of insecurity of the data owner can be eliminated as much as possible.

With the configuration as described in the present embodiment, for example, in the event that a user transmits a job to a certain device from the user's own device, and finds that the device cannot process the job immediately, trouble and labor that can occur conventionally such as the user canceling the job and requesting to another device for processing, or the like, can be eliminated, and in addition, in the event that the user accidentally transmits a job for processing secret documents, private documents, or the like to a device which cannot process the job immediately, waiting time as with conventional arrangements in which the user worries about secrets leaking, private information leaking, and the like, until a job is processed, can be prevented.

With the configuration as described in the present embodiment, a user-friendly and user-advantageous arrangement capable of preventing problems that cannot be handled by a confirmation display function of a printer state or the like provided by a conventional printer driver or the like, and also solving the problems assumed in the conventional art, can be provided.

For the sake of solving the problems assumed in the conventional art, the same processing and control is performed uniformly regardless of whether or not a job to be processed is any content or any type of job, so that new problems such as reduction in intended user operability, and the like occurs, but with the configuration as described in the present embodiment, an arrangement for preventing such new problems can be provided.

Note that with a system for handling secret information and private information such as with an electronic government, in the event of future advancement in environments in which a printer or the like is used for processing of secret documents or private documents such as with an electronic government, and also in the event that the user accidentally transmits a job relating to processing of secret documents, private documents, or the like to a device which cannot process the job immediately, waiting time as with conventional arrangements in which the user worries about secrets leaking, private information leaking, and the like, until a job is processed, can be prevented from occurring, thus advantageously serving as very effective processing.

Description is made below regarding the configuration of a data processing program that can be read at each device making up a system to which the information processing device and image processing device according to the present invention can be applied with reference to the memory map illustrated in FIG. 17.

FIG. 17 is an explanatory diagram describing the memory map of a storing medium (recording medium) storing various types of data processing programs that can be read by each device making up a system to which the information processing device and image processing device according to the present invention can be applied.

Although not illustrated in the drawing, information managing a program group to be stored in a recording medium, for example, version information, creator or the like is recorded, and also information depending on an operating system (OS) or the like on the program readout side, for example, icons or the like for identifiably displaying a program can be recorded.

Further, data belonging to various types of programs is also managed in the aforementioned directory. Also, a program for installing various types of programs in a computer, a program for uncompressing a compressed program in the event that a program to be installed is compressed, and the like are sometimes recorded.

The functions illustrated in FIGS. 7, 9, and 15 in the present embodiment may be performed by a program to be externally installed on the host computer. In this case, even in the event that an information group including the program is supplied to an output device from a recording medium such as CD-ROM (compact disk—ROM), flash memory, FD (floppy disk), or the like, or from an external recording medium via a network, the present invention is applied.

As described above, the functions of the present invention can be realized even with an arrangement in which a recording medium storing software program code for realizing the functions of the aforementioned embodiments is supplied in a system or device, the computer (CPU or MPU (microprocessing unit)) of the system or device reads out the program code stored in the recording medium and executes the program code.

In this case, the program code itself read out from the recording medium realizes a new function of the present invention.

Accordingly, the form of the program is not restricted to any particular form, any form can be used, such as object code, a program executed by an interpreter, script data to be supplied to an OS, or the like, as long as the functions of the program are included.

Examples of a recording medium for supplying the program include a floppy disk, hard disk, optical disk, magneto-optical disk (MO), CD-ROM, CD-R (CD-recordable), CD-RW (CD-rewritable), magnetic tape, nonvolatile memory card, ROM, and DVD (digital versatile disk).

In this case, the program code itself read out from the recording medium realizes the functions of the aforementioned embodiments.

As for a method for supplying the program, an arrangement can be made in which the user connects to a Web site over the Internet using the browser of the client computer, and downloads the computer program itself according to the present invention from the Web site, or a compressed file including an automatic install function to a recording medium such as a hard disk, thus supplying the program. Also, an arrangement may be made wherein the program code making up the program according to the present invention is divided into multiple files, and each file is downloaded from a different Web site, thus supplying the program. In other words, a WWW (world wide web) server and an FTP (file transfer protocol) server and the like for downloading the program file for realizing the function processing according to the present invention on the computer are also encompassed in the scope of the present invention.

Also, an arrangement may be made wherein the program according to the present invention is encrypted and stored in a recording medium such as a CD-ROM or the like so as to be distributed to users, with users clearing predetermined conditions being prompted to download key information for decrypting the program encrypted from the Web site via the Internet, and execute the program encrypted using the key information so as to install the program in a computer, thus realizing the functions according to the above-described embodiments.

Also, an OS or the like running on the computer based on the instructions of the program code can perform part of or all of the processing, and the functions of the aforementioned embodiments are realized by the processing, are encompassed in the present invention.

Further, the program code read out from the recording medium can be written in memory included in a function expansion board inserted in the computer or a function expansion unit connected to the computer, following which the CPU or the like included in the function expansion board or function expansion unit performs part of or all of the processing based on the instructions of the program code, and the functions of the above-described embodiments are realized by the processing, are encompassed in the present invention.

Also, the present invention may be applied to a system made up of multiple devices, or an apparatus made up of a single device. The present invention can be applied to a case in which the functions of the present invention are realized by supplying the program in a system or a device. In this case, the system or device can receive the advantages according to the present invention by reading out the recording medium storing the program represented by software for achieving the present invention.

The present invention is not restricted to the above-described embodiments, various types of modifications (including an organic combination of each embodiment) can be made based on the sprit of the present invention, and these are also encompassed in the scope of the present invention.

While various examples and arrangements of the present invention have been illustrated and described, one skilled in the art will understand that the spirit and scope of the present invention are not restricted to any particular description in the present specification.

As described above, heretofore, status display of a driver has been in a passive manner, and status confirmation processing has been performed using polling. However, with the present invention, with regard to a specific job alone, in the event that job output activation is input from the driver, a warming-up state, errors, consumables, the amount of print jobs, and the like of a device serving as the output destination of the job are checked, and only in the event that the device can process the job immediately, the job is transmitted.

Also, an arrangement may be made wherein the acquired status of the device is displayed when the job output activation is input, and the user is prompted to confirm this status, following which the user is prompted to instruct whether or not output of the job should be performed.

Note that an arrangement may be made wherein in the event that the device cannot process the job immediately, not only regarding whether or not transmission of the job to the device (activation of the device) should be performed, but also options of rerouting of the job to another device, and the like, are also presented to the user.

Further, an arrangement may be made wherein a job can be output to a device not only with a device driver but also with the job input tool or input to a hot folder.

According to these arrangements, in the event that a user attempts to transmit a job to a device which cannot process the job immediately even if the user transmits the job, the status of the device can be checked so as to display a warning in real time, or an alternative, such as prompting the user to process the job with another method presented to the user, thus preventing needless job transmission.

Also, transmission of a job that processes information that the user wants to hide, such as secret information, critical documents, or private information, and waiting for processing, can be avoided, thus preventing the record of critical documents and history of information from remaining in a useless device (device that cannot process the job immediately).

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-162021 filed May 31, 2004, which is hereby incorporated by reference herein.

What is claimed is:

1. An information processing apparatus which is capable of communicating with a printing device, the apparatus comprising:
   a receiving unit configured to receive a transmission instruction for transmitting print job data to the printing device from a user;
   a judging unit configured to judge whether print job data instructed to be transmitted to the printing device by the transmission instruction is a particular type of print job data;
   a determination unit configured to inquire for a status of the printing device and determine whether the printing device is in an immediately-printable state, in a case where it is judged that the print job data is the particular type of print job data, and not to inquire for the status of the printing device or determine whether the printing device is in the immediately-printable state, in a case where it is judged that the print job data is not the particular type of print job data;
   a first transmitting unit configured to transmit the print job data to the printing device in order to perform printing processing by the printing device, in a case where it is judged that the print job data is the particular type of print job data and it is determined that the printing device is in the immediately-printable state;
   a second transmitting unit configured to transmit the print job data to the printing device in order to perform printing processing by the printing device without determining whether the printing device is in the immediately-printable state, in a case where it is judged that the print job data is not the particular type of print job data;
   a display unit configured to display a screen which is for allowing the user to select whether or not to cancel the printing processing and switch to storing processing for storing the print job data in a memory included in the printing device, in a case where it is judged that the print job data is the particular type of print job data and it is determined that the printing device is not in the immediately-printable state; and
   a third transmitting unit configured to transmit the print job data to the printing device so as to cause the printing device to perform the storing processing for storing the print job data in the memory included in the printing device, in a case where the user selects to switch to the storing processing.

2. The information processing apparatus according to claim 1, wherein a non-immediately-printable state corresponds to any of a status that an error occurs and a status that a number of print jobs waiting for processing is equal to or greater than a predetermined number.

3. The information processing apparatus according to claim 1, wherein the particular type of data is any one of data specified by the user as a critical document, data to which color printing is specified, and data to which watermark printing is specified.

4. The information processing apparatus according to claim 1, wherein the display unit displays the screen on a screen of a printer driver included in the information processing apparatus.

5. The information processing apparatus according to claim 1, wherein the display unit displays the screen on a screen of a web browser included in the information processing apparatus.

6. The information processing apparatus according to claim 1, wherein the screen displayed by the display unit is for allowing the user to select one of executing of the storing processing by the printing device, transmitting of the print job data to the printing device, or canceling of the printing processing.

7. The information processing apparatus according to claim 6, wherein the screen displayed by the display unit is for further allowing the user to select an e-mail transmission of the print job data to a specified e-mail address.

8. An information processing method for an information processing apparatus which is capable of communicating with a printing device, the method comprising:
   receiving a transmission instruction for transmitting print job data to the printing device from a user;
   judging whether print job data instructed to be transmitted to the printing device by the transmission instruction is a particular type of print job data;
   inquiring for a status of the printing device and determining whether the printing device is in an immediately-printable state, in a case where it is judged that the print data is the particular type of data, and not to inquire for the status of the printing device or determine whether the printing device is in the immediately-printable state, in a case where it is judged that the print job data is not the particular type of print job data;
   transmitting the print job data to the printing device in order to perform printing processing by the printing device, in a case where it is judged that the print job data is the particular type of print job data and it is determined that the printing device is in the immediately-printable state;
   transmitting the print job data to the printing device in order to perform printing processing by the printing device without determining whether the printing device is in the immediately-printable state, in a case where it is judged that the print job data is not the particular type of print job data;
   displaying a screen which is for allowing the user to select whether or not to cancel the printing processing and switch to storing processing for storing the print job data in a memory included in the printing device, in a case where it is judged that the print job data is the particular type of print job data and it is determined that the printing device is not in the immediately-printable state; and
   transmitting the print job data to the printing device so as to cause the printing device to perform the storing processing for storing the print job data in the memory included in the printing device, in a case where the user selects to switch to the storing processing.

9. A computer-readable storage medium having stored thereon a program including computer-executable instructions for performing an information processing method for an information processing apparatus which is capable of communicating with a printing device, the method comprising:
  receiving a transmission instruction for transmitting print job data to the printing device from a user;
  judging whether print data is a particular type of data;
  inquiring for a status of the printing device and determining whether the printing device is in an immediately-printable state, in a case where it is judged that the print data is the particular type of data, and not to inquire for the status of the printing device or determine whether the printing device is in the immediately-printable state, in a case where it is judged that the print job data is not the particular type of print job data;
  transmitting the print job data to the printing device in order to perform the printing processing by the printing device, in a case where it is judged that the print job data is the particular type of print job data and it is determined that the printing device is in an immediately-printable state;
  transmitting the print job data to the printing device in order to perform printing processing by the printing device without determining whether the printing device is in the immediately-printable state, in a case where it is judged that the print job data is not the particular type of print job data;
  displaying a screen which is for allowing the user to select whether or not to cancel the printing processing and switch to storing processing for storing the print job data in a memory included in the printing device, in a case where it is judged that the print job data is the particular type of print job data and it is determined that the printing device is not in an immediately-printable state; and
  transmitting the print job data to the printing device so as to cause the printing device to perform the storing processing for storing the print data in the memory included in the printing device, in a case where the user selects to switch to the storing processing.

* * * * *